United States Patent
Wu et al.

(10) Patent No.: US 10,075,067 B2
(45) Date of Patent: Sep. 11, 2018

(54) TWO-SWITCH SWITCHED-CAPACITOR CONVERTERS

(71) Applicants: The Regents of the University of California, Oakland, CA (US); Ramot at Tel Aviv University Ltd., Tel Aviv (IL)

(72) Inventors: Bin Wu, Irvine, CA (US); Keyue Ma Smedley, Aliso Viejo, CA (US); Sigmond Singer, Tel Aviv (IL)

(73) Assignees: THE REGENTS OF THE UNIVERSITY OF CALIFORNIA, Oakland, CA (US); RAMOT AT TEL AVIV UNIVERSITY LTD., Tel Aviv (IL)

( * ) Notice: Subject to any disclaimer, the term of this patent is extended or adjusted under 35 U.S.C. 154(b) by 39 days.

(21) Appl. No.: 14/659,216

(22) Filed: Mar. 16, 2015

(65) Prior Publication Data
US 2015/0263612 A1    Sep. 17, 2015

Related U.S. Application Data

(60) Provisional application No. 61/953,871, filed on Mar. 16, 2014.

(51) Int. Cl.
*H02M 3/07*    (2006.01)

(52) U.S. Cl.
CPC ........ *H02M 3/07* (2013.01); *H02M 2003/072* (2013.01)

(58) Field of Classification Search
CPC ............. H02M 3/07; H02M 2003/072; H02M 2003/077; H02M 2003/075
See application file for complete search history.

(56) References Cited

U.S. PATENT DOCUMENTS 8,036,008 B2 * 10/2011 Ikeda .................... H02M 3/158
                                                              363/65
8,098,055 B2    1/2012 Avrutsky et al.
(Continued)

FOREIGN PATENT DOCUMENTS

WO    2012-088641    7/2012

OTHER PUBLICATIONS

Wu, Bin et al., A New 3X Interleaved Bidirectional Switched Capacitor Converter, IEEE Applied Power Electronics Conference and Exposition Proc. (APEC), pp. 1433-1439, Mar. 2014.

*Primary Examiner* — Harry Behm
(74) *Attorney, Agent, or Firm* — Thomas Horstemeyer, LLP

(57) ABSTRACT

Various examples are provided for two-switch switched-capacitor (SC) converters. In one example, a SC converter includes first and second switches connected in series, a first gain-extension network coupled to the first switch and a second gain-extension network coupled to the second switch, which can be operated to boost a voltage applied across the first and second switches. The gain-extension networks can include a diode and a capacitor. In another example, the gain-extension networks can include a switch and a capacitor, which can be operated to buck a voltage applied across the gain-extension networks. In another example, a SC converter includes first and second diodes connected in series, a first gain-extension network coupled to the first diode and a second gain-extension network coupled to the second diode. The gain-extension networks can include a switch and a capacitor, which can be operated to buck a voltage applied across the gain-extension networks.

20 Claims, 24 Drawing Sheets

(56) References Cited

U.S. PATENT DOCUMENTS

| | | | |
|---|---|---|---|
| 8,970,067 B2 | 3/2015 | Fu et al. | |
| 9,000,740 B2 | 4/2015 | Touzani et al. | |
| 9,041,251 B2 | 5/2015 | Schill | |
| 9,318,952 B2* | 4/2016 | Oraw | H02M 3/07 |
| 2002/0089369 A1* | 7/2002 | Ikeda | H02M 3/07 |
| | | | 327/536 |
| 2009/0322384 A1* | 12/2009 | Oraw | H02M 3/07 |
| | | | 327/112 |
| 2012/0154013 A1* | 6/2012 | Mera | G11C 11/4074 |
| | | | 327/333 |
| 2013/0094157 A1* | 4/2013 | Giuliano | H01L 23/481 |
| | | | 361/748 |
| 2015/0155895 A1* | 6/2015 | Perreault | H04B 1/0458 |
| | | | 455/127.3 |
| 2016/0234901 A1* | 8/2016 | Delos Ayllon | H05B 33/0815 |

* cited by examiner

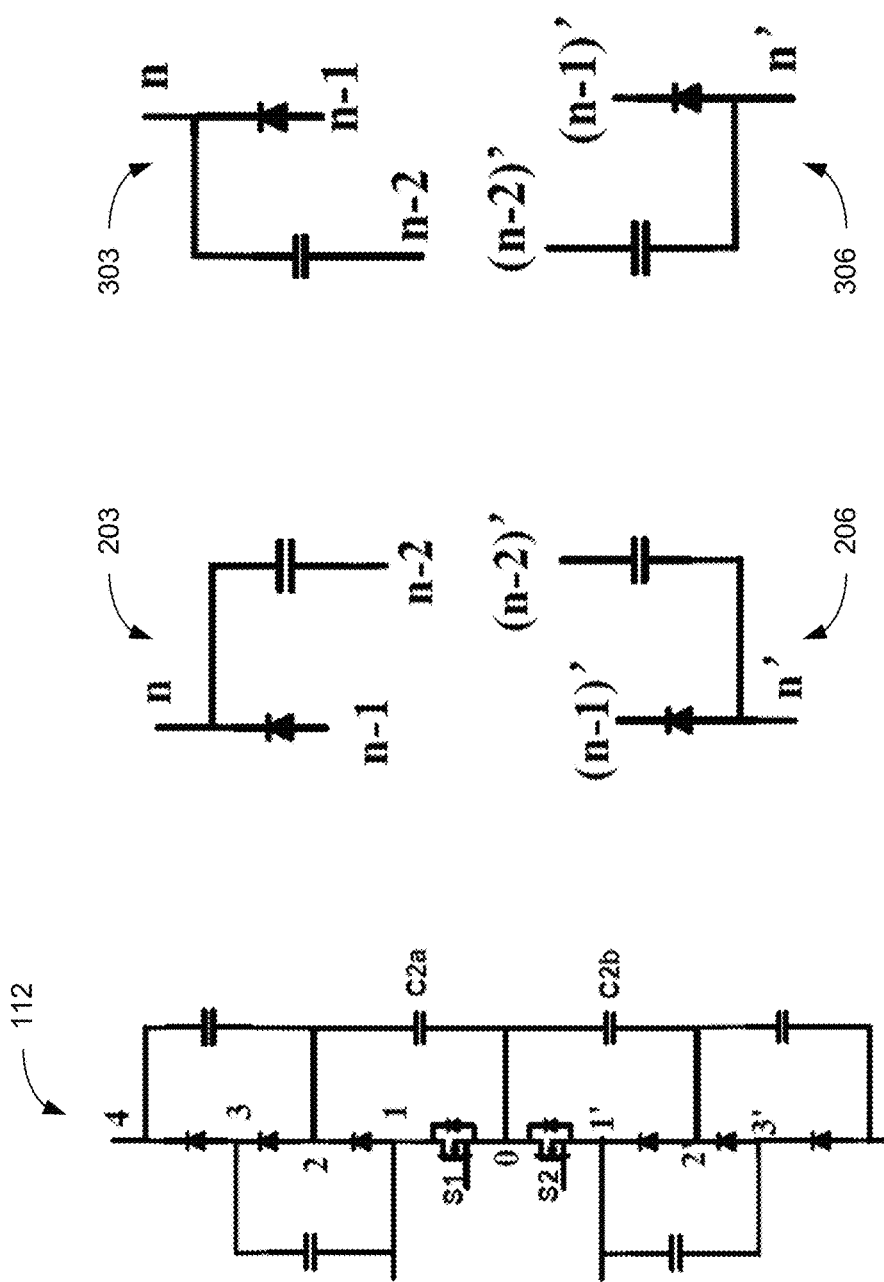

US 10,075,067 B2

TWO-SWITCH SWITCHED-CAPACITOR CONVERTERS

CROSS REFERENCE TO RELATED APPLICATIONS

This application claims priority to U.S. provisional application entitled "TWO-SWITCH SWITCHED-CAPACITOR CONVERTERS" having Ser. No. 61/953,871, filed Mar. 16, 2014, which is hereby incorporated by reference in its entirety.

STATEMENT REGARDING FEDERALLY SPONSORED RESEARCH OR DEVELOPMENT

This invention was made with government support under agreement 2011507 awarded by the Binational Science Foundation (BSF). The Government has certain rights in the invention.

BACKGROUND

Switched-capacitor converters (SCs) belong to a branch of power electronic converters, which includes capacitors and switches without the participation of inductors. Compared to traditional inductor based boosting converters; SCs may be used to achieve lower electromagnetic interference (EMI), lighter weight, lower cost, and/or higher energy density. Many SC topologies have a high component count or pulsating current.

BRIEF DESCRIPTION OF THE DRAWINGS

The present disclosure may be better understood with reference to the following figures. Matching reference numerals designate corresponding parts throughout the figures, which are not necessarily drawn to scale.

FIGS. 2A-2D are schematic diagrams of various examples of two-switch boosting switched-capacitor converter (TBSC) configurations in accordance with various embodiments of the present disclosure.

FIGS. 3 and 4 are schematic diagrams of examples of gain-extension networks used in the nxTBSCs of FIGS. 2B-2D in accordance with various embodiments of the present disclosure.

Figure 11:
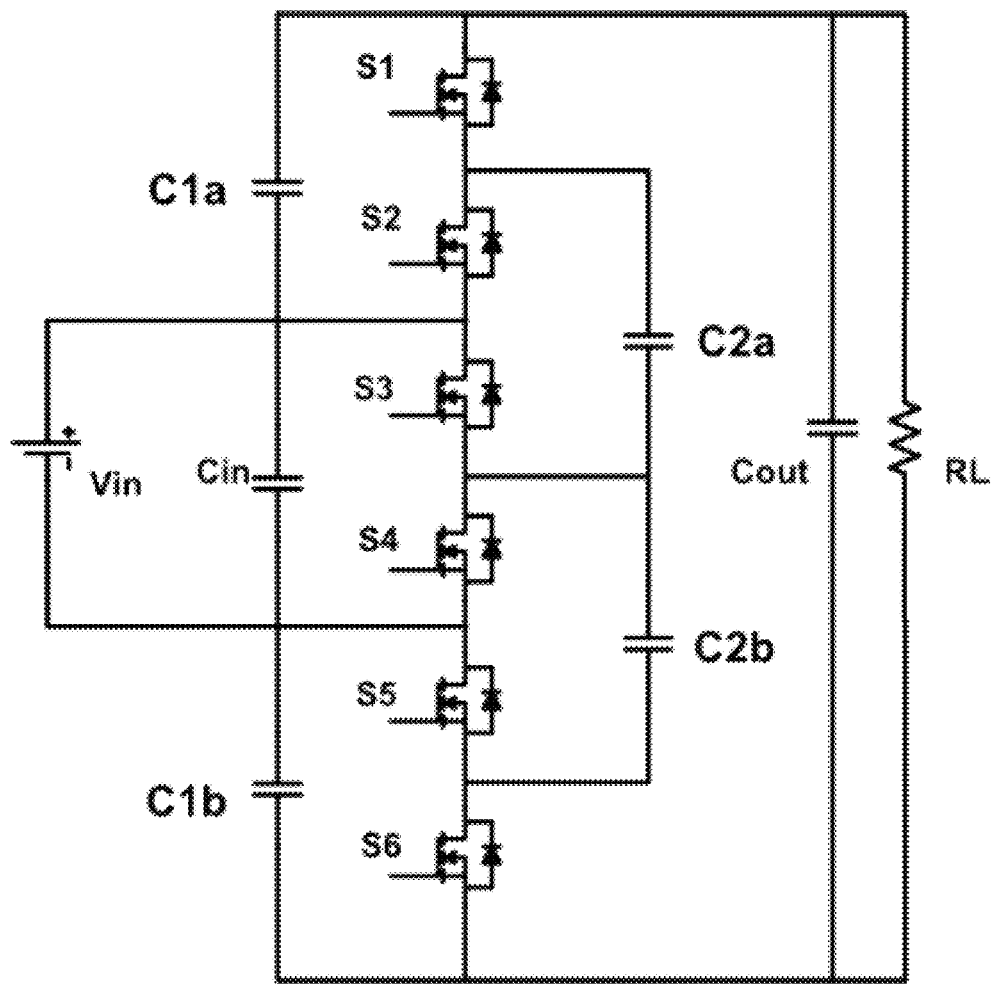
FIG. 11 is a schematic diagram of an example of a 3× bidirectional TBSC of FIG. 9 in accordance with various embodiments of the present disclosure.

18A and 18B are plots of simulation waveforms for the 3×TBSC of FIG. 11 in accordance with various embodiments of the present disclosure.

Figure 19A:
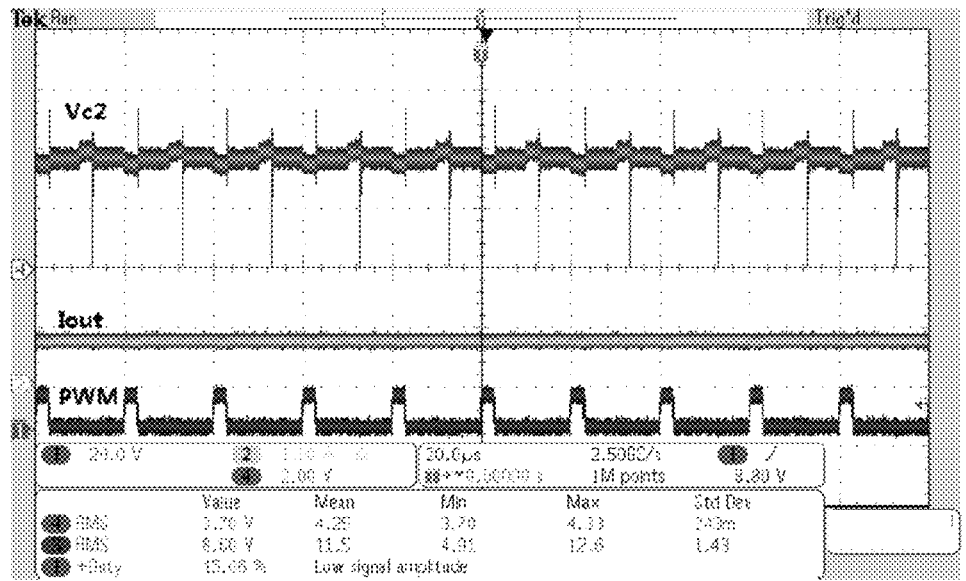
Figure 19B:
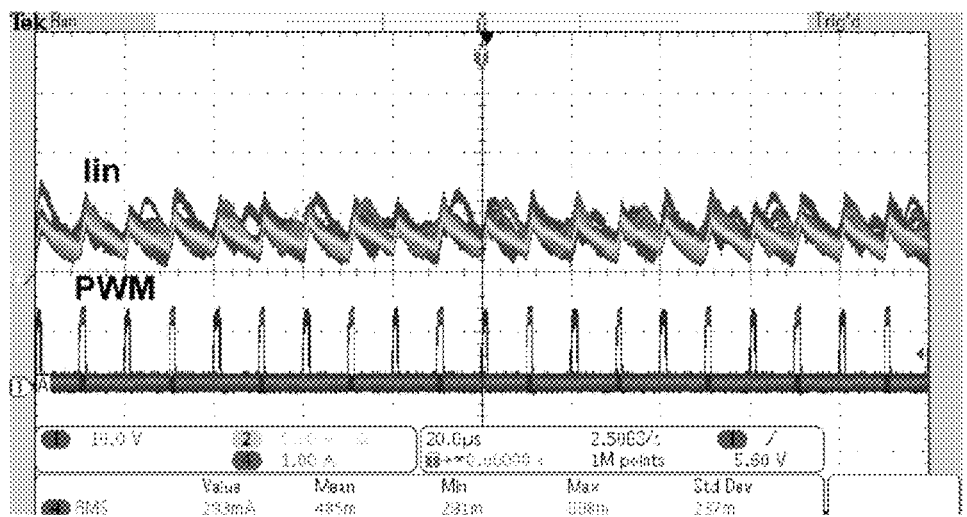
Figure 19C:
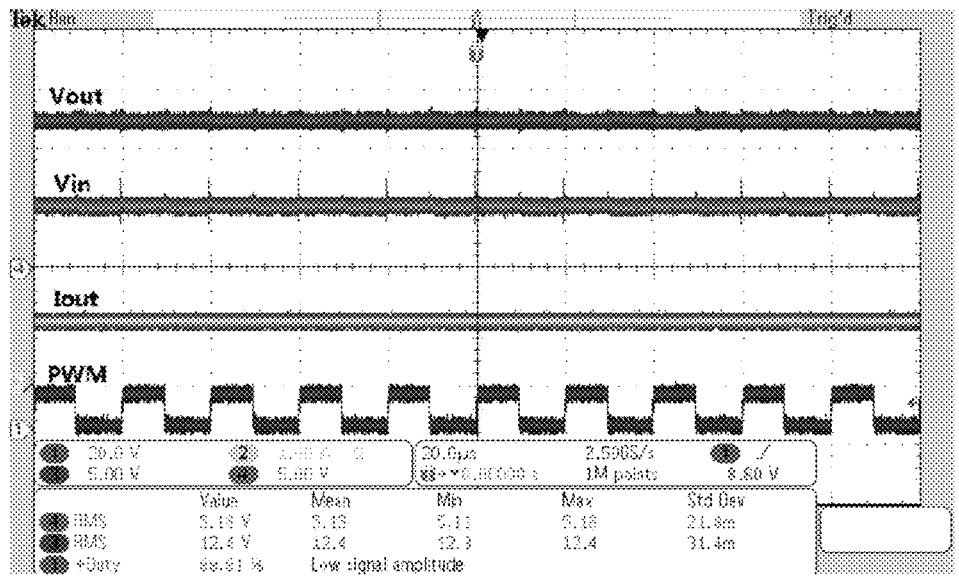

FIG. 19A through 19C are plots of experimental waveforms for the 3×TBSC of FIG. 11 in accordance with various embodiments of the present disclosure.

Figure 20A:
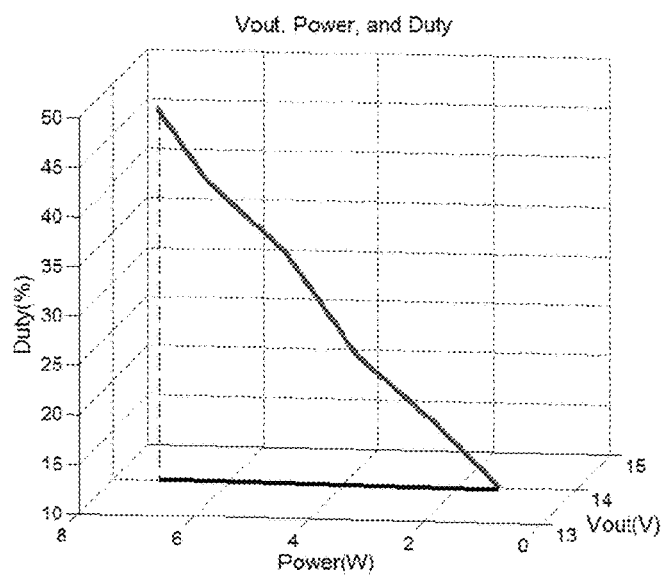
Figure 20B:
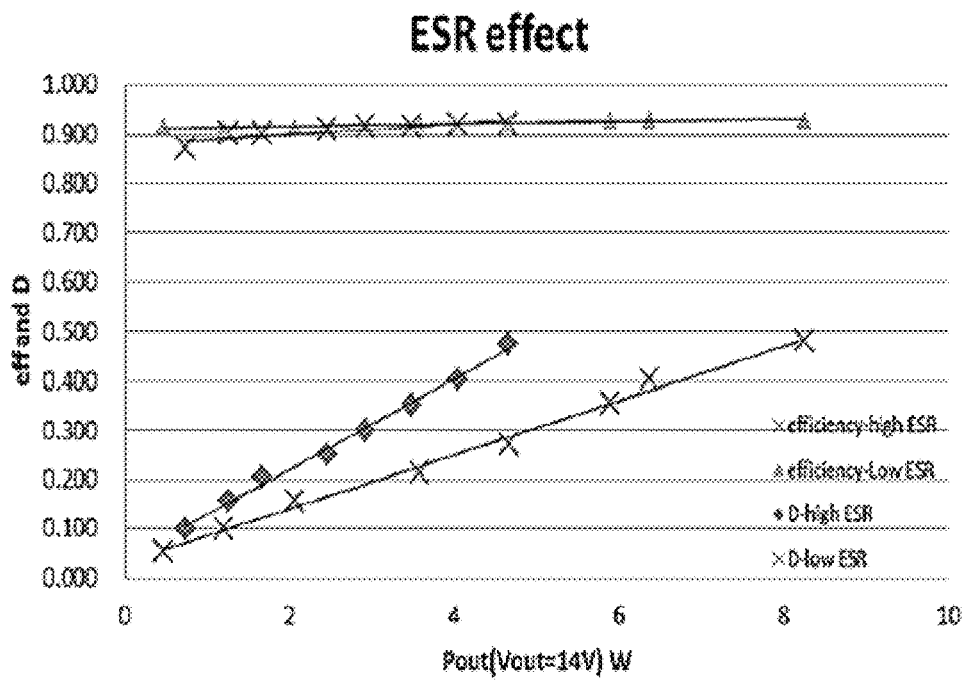
Figure 20C:
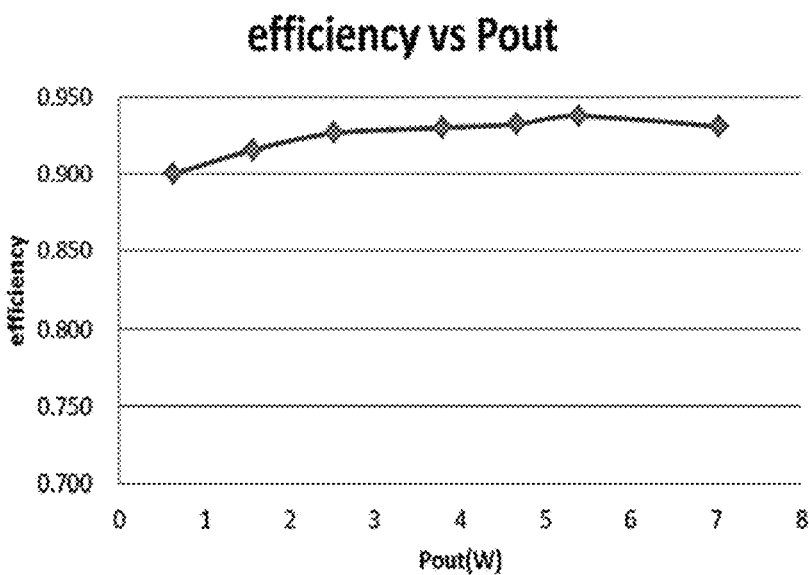

FIG. 20A through 20C are plots illustrating regulation capabilities of the 3×TBSC of FIG. 11 in accordance with various embodiments of the present disclosure.

Figure 21A:
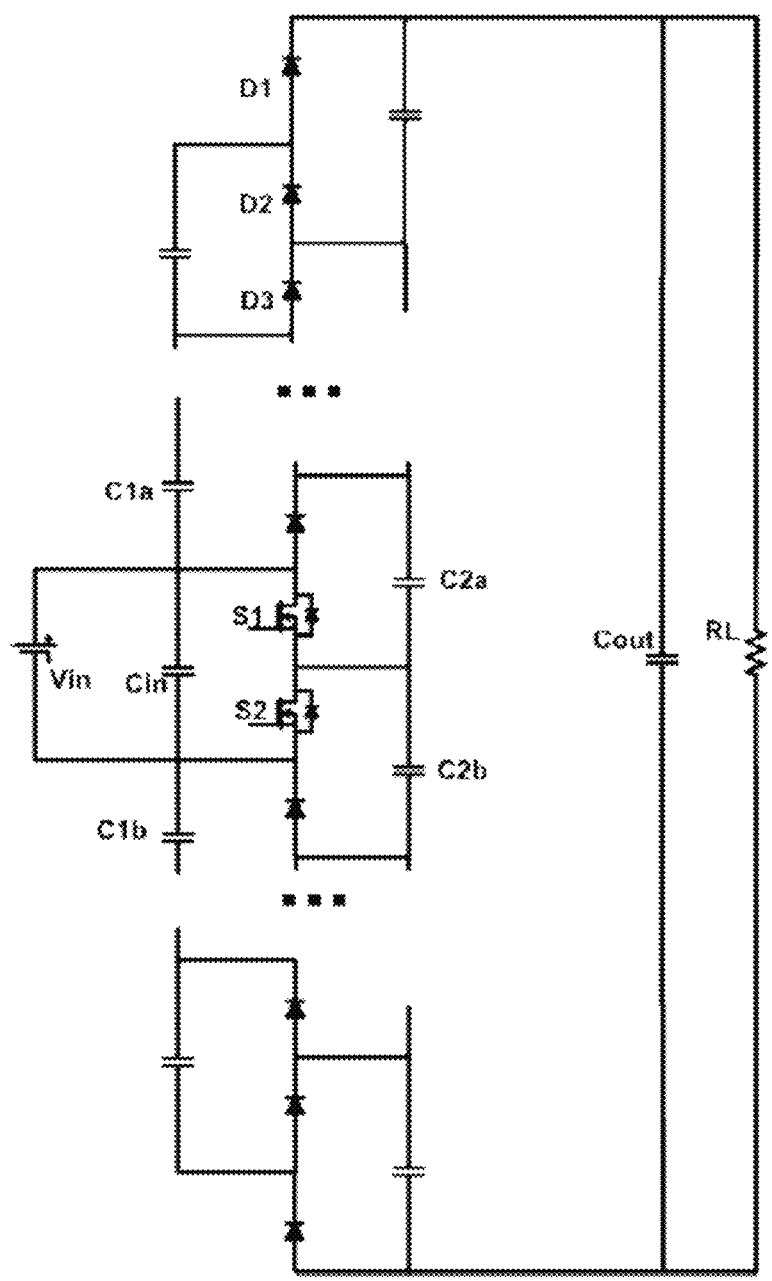
Figure 21B:
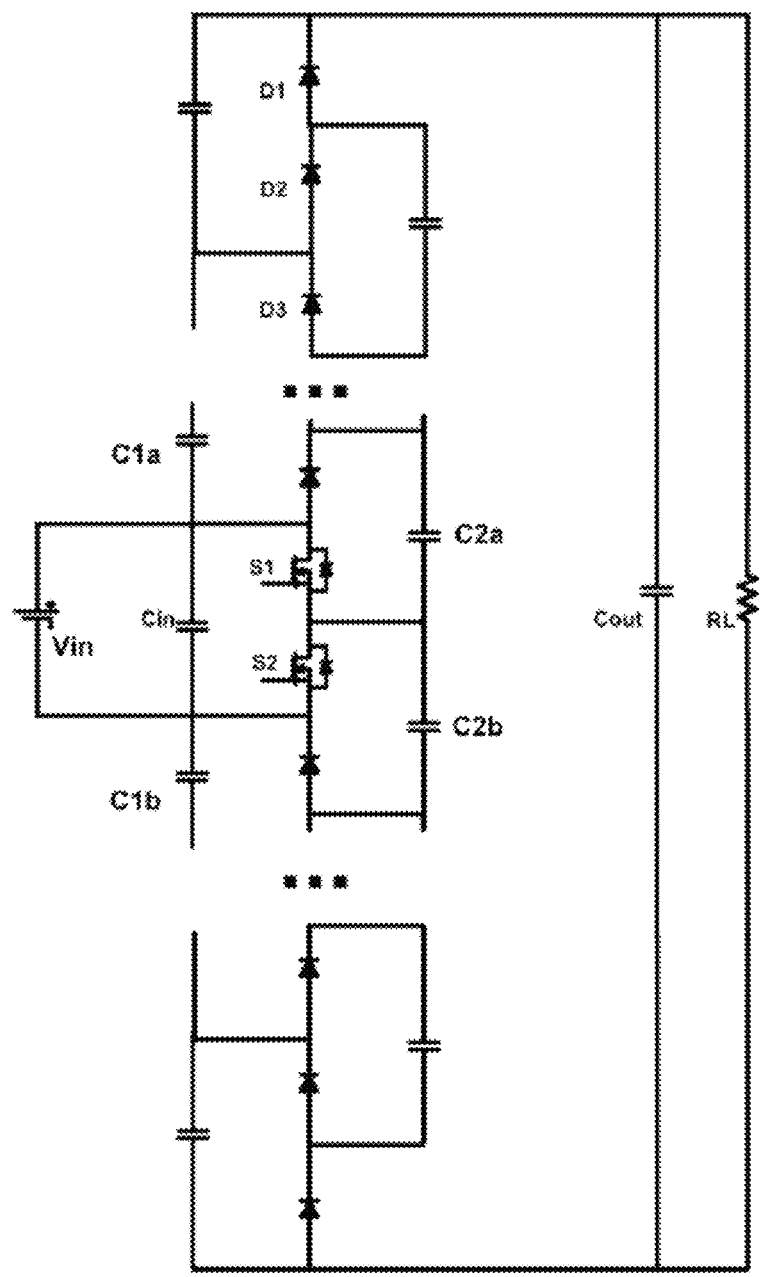

FIGS. 21A and 21B are schematic diagrams of examples of even and odd gain TBSC topologies in accordance with various embodiments of the present disclosure.

DETAILED DESCRIPTION

In the following disclosure, various examples are described of a family of two-switch boosting switched-capacitor converters (TBSCs), which can be modified to operate in bidirectional or buck versions. TBSCs feature a simple circuit, interleaved operation, and systematic expandability. The circuit can be implemented in the form of a discrete circuit for high-power applications or in the form of an integrated circuit for low-power applications. The TBSCs are suitable for, e.g., renewable power conversion from low voltage to high voltage, for connecting battery to high-voltage DC to perform charging and discharging, and/or for micro-grid operation with distributed DC sources, batteries, and/or loads. It is to be understood that the embodiments are example implementations of the disclosed inventions and that alternative embodiments are possible. All such embodiments are intended to fall within the scope of this disclosure.

Switched-capacitor (SC) converters use a switch and capacitor network to realize voltage level change such as a step up or a step down. Compared with traditional inductor based converters, such as buck and boost converters, the switched-capacitor converter exhibits great potential in chip level integration, reduced weight, and minimized cost, since integration of an inductor is much more challenging than that of a capacitor. The switched-capacitor converter power density can also be demonstrated to be higher than conventional inductive converters.

In 1990s, switched-capacitors converter focused on low power applications, aimed at smoothing the input current, reducing the output voltage ripple and enhancing the regulation capability. Different topologies and regulation methods were proposed. These converters mainly fall into four categories: step-up converters, low gain step down converters, high-gain step down converters and inverters. For slight step down converters, only one capacitor was used as the middle stage to deliver power from input to output. The charging amount from input source to the middle stage capacitor mainly determines the voltage gain. To reduce the input current spike and minimize output voltage ripple, an interleaved configuration with two symmetrical units was usually adopted. PWM regulation can be employed to control the charging time to realize certain regulation capability. Frequency modulation and current source control methods may also be used. However, the efficiency of regulated SC converters was typically low.

Figure 1A:
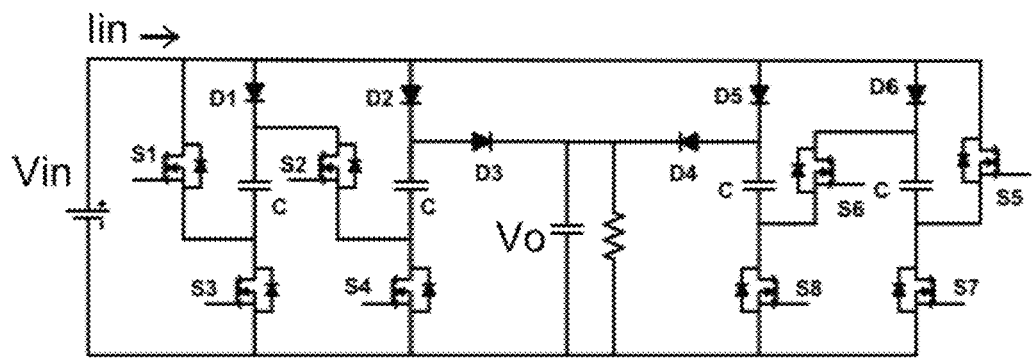
FIGS. 1A and 1B illustrate an example of a switched-capacitor (SC) converter and its operation in accordance with various embodiments of the present disclosure.

A traditional step-up switched-capacitor converter charges some capacitors in parallel with input source. Then, the charged capacitors are switched to series connection with the input to derive a higher output voltage by modifying the operation state of switches. An example of a typical voltage tripler topology for a SC converter is shown in FIG. 1A. The symmetrical parts of the topology are interleaved by 180 degree. For the left side unit, when switches S3 and S4 are on, switches S1 and S2 will be turned off. Thus, the input source (17) will charge the two capacitors (C) in parallel. For the right side counterpart, switches S5 and S6 will be turned on while switches S7 and S8 are turned off. Thus, the right half topology will deliver power to output. This configuration reduces the input current spikes and output voltage ripple compared with non-interleaved topologies. But it increases the number of components.

Figure 1B:
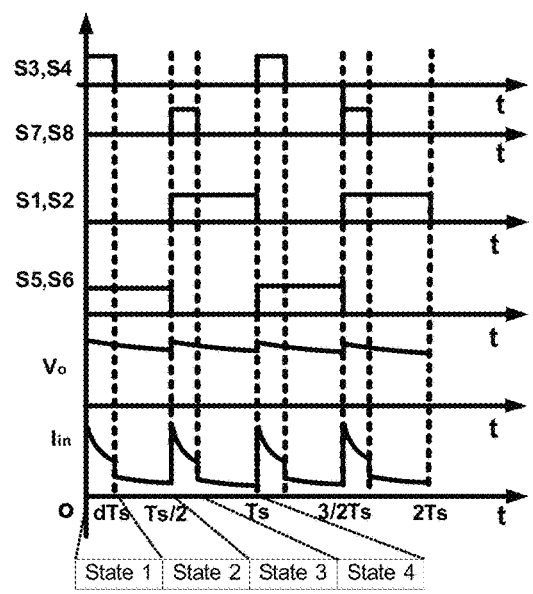

The operation waveform of the 3×SC converter is shown in FIG. 1B. According to a state-space averaging method, the voltage gain can be derived as follows:

$$V_{out} = \frac{3(V_{in} - V_D)}{1 + \left(2 + \frac{1}{d}\right)\frac{Y_L}{g}}, \quad (1)$$

where $$g = \frac{1}{r + r'}; Y_L = \frac{1}{R_L}.$$

here $V_D$ is me voltage drop of the diode, r is the on resistance of all switches, r' is the equivalent series resistance (ESR) of all capacitors and $R_L$ is the load resistance. Equation (1) shows that the voltage gain $V_{out}/V_{in}-V_D$ can be determined by duty cycle (d) and load ($R_L$) together. The loop resistance will also affect the voltage gain, which is important in system efficiency of the switched-capacitor converter. While the feasibility of PWM modulation was demonstrated, within this method the switching frequency effect and capacitor effect on voltage gain is neglected. It can be adequate in most cases, especially when PWM modulation is the only adopted control strategy.

In this disclosure, an interleaved switched-capacitor (SC) converter with PWM regulation is disclosed. It offers potential advantages in applications such as, e.g., solar cell energy harvesting or battery energy management where voltage sources between input and output do not require a common ground.

A two-switch boosting switched-capacitor converter (TBSC) can be distinguished by its simple circuit, interleaved operation, -low/even voltage stress on components, and/or systematic expandability. Each TBSC circuit comprises three types of components: switches, diodes, and capacitors. Control of a TBSC is simple because it uses only two interleaved active switches. Due to the symmetrical interleaved configuration of the circuit, the input current spike is minimized. In addition, it has a lower component count when compared with intentional interleaved switched-capacitor topologies. Another advantage of proposed topology is that the voltage rating of all the components, except the input and output filter components that may be added later, is defined by the low-side voltage $V_L$ regardless the voltage gain.

The TBSC family contains n members, where n=1, 2, 3 . . . . FIGS. 2A-2D show schematic diagrams of various examples of TBSC members. Referring to FIG. 2A, shown is an example of the first member, which is a 1×TBSC (103). It comprises a two-switch 3-terminal network with terminals identified as 0, 1, and 1'. The 1×TBSC (103) is the core used to build the entire TBSC family. For each of the TBSC members, terminal 1-1' is defined as the low side, while terminal n-n' is the high side.

In order to obtain the second member in the TBSC family, a pair of n=2 gain-extension networks (e.g., 203 and 206 shown in FIG. 3) are added to the 1×TBSC (103) of FIG. 2A. As shown in FIG. 3, the upper gain-extension network (203) includes terminals 0, 1, and 2 and the lower gain-extension network (206) includes terminals 0', 1', and 2'. By connecting the matching terminals of the gain-extension networks (203 and 206) and the 1×TBSC (103), a 2×TBSC (106) topology can be derived as shown in FIG. 2B. By operating the two switches S1 and S2 in an interleaved manner, the voltage produced at the high side of this 2×TBSC (106) configuration is double of that of the low side.

Figure 2C:
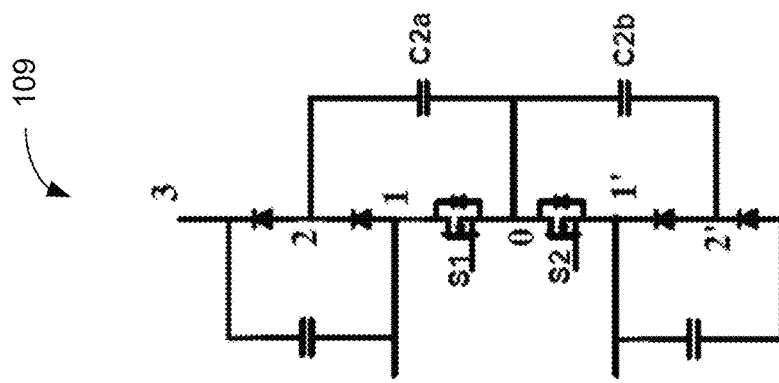
Figure 2B:
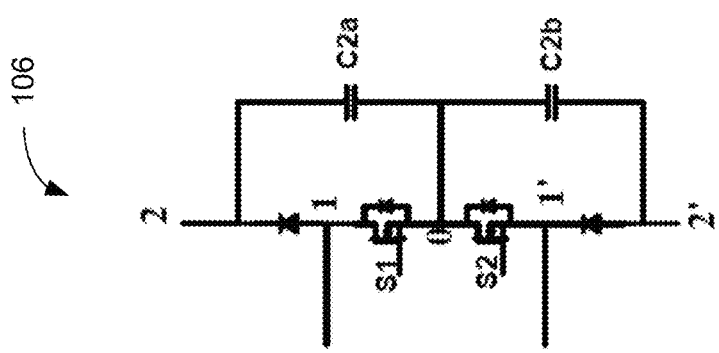
Figure 2A:
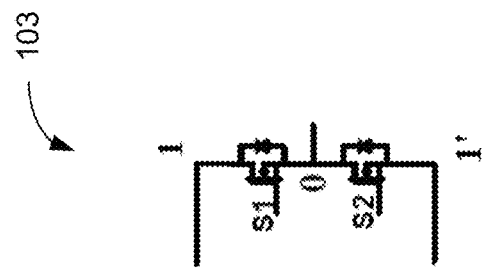

By further adding a pair of n=3 gain-extension networks (e.g., 303 and 306 shown in FIG. 4) to the 2×TBSC (106) of FIG. 2B at terminals 1, 2 and 1', 2' in a similar fashion, a 3×TBSC (109) topology can be derived as shown in FIG. 2C. This 3×TBSC (109) configuration triples the low-side voltage by operating the two active switches S1 and S2 in an interleaved manner.

To synthesize a 4×TBSC (112) topology, a pair of n=4 gain-extension networks (e.g., 203 and 206 shown in FIG. 3) are added to the 3×TBSC (109) of FIG. 2C at terminals 2, 3 and 2', 3' in a similar fashion. Thus, this 4×TBSC (112) configuration with 4× gain can be derived as shown in FIG. 1D.

This process can continue indefinitely to obtain a TBSC with a gain of arbitrary positive digital number n. In general, in order to obtain n×TBSC, a pair of 3-terminal gain-extension networks, the upper gain-extension network including terminals n-2, n-1, and n and the lower gain-extension network including terminals (n-2)', (n-1)', and n', as illustrated in FIG. 3 or FIG. 4, are added to the (n-1)× TBSC. The gain-extension networks (203 and 206) of FIG. 3 are added for n=2, 4, 6 . . . and the gain-extension networks (303 and 306) of FIG. 4 are added for n=3, 5, 7 . . . . By connecting the matching terminals of the gain-extension networks to the (n-1)×TBSC, the n×TBSC configuration is derived. The voltage at the high side is n times of the low-side voltage (applied to terminal 1 and 1') without regulation by operating the two active switches S1 and S2 in an interleaved manner.

Figure 5:
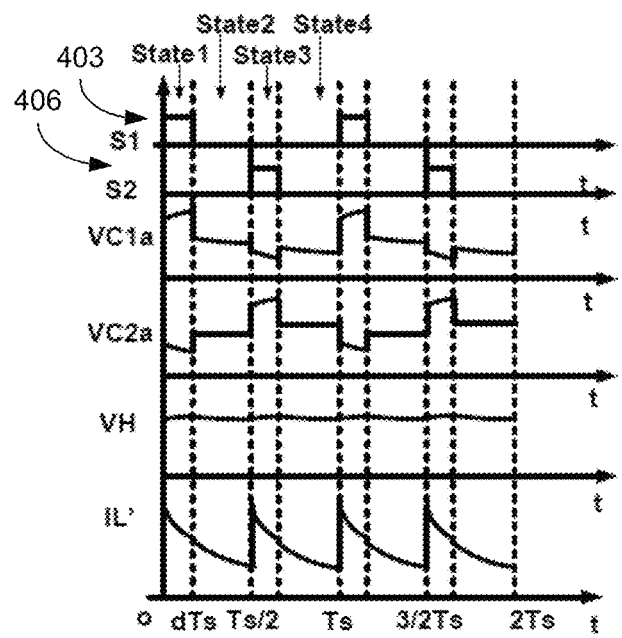
FIG. 5 is a plot illustrating an example of the operation of a 3×TBSC of FIG. 2C in accordance with various embodiments of the present disclosure.

An example of the interleaved operation of S1 and S2 is illustrated by the two top waveforms (403 and 406) of FIG. 5, with a duty ratio of about 0.5 respectively. The component count of an n×TBSC topology (excluding filters) is given by:

$$\text{Component count} = 2S + 2(n-1)(D+C) \qquad (2)$$

where S is the number of switches, n is the voltage gain, D is the number of diodes, and C is the number of intermediate capacitors. In practice, filters can be included at the low side and high side. The filters can be a capacitive and/or inductive based filter such as C, LC, CLC, etc.

Operation of TBSC

Figure 6A:
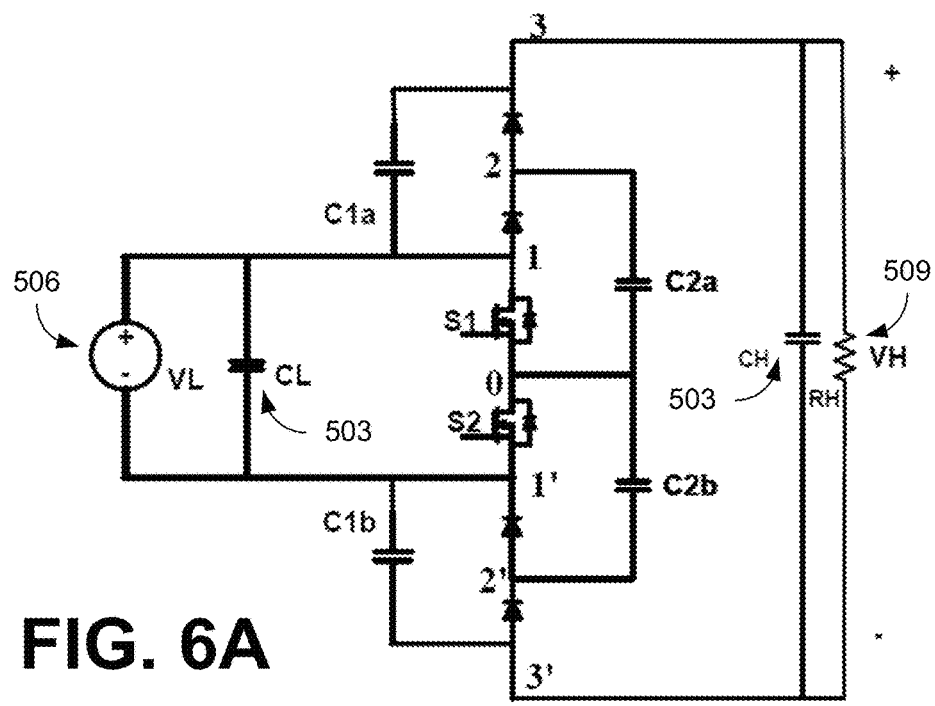
FIG. 6A is a schematic diagram of a 3×TBSC of FIG. 2C with a source connected to the low side and a load connected to the high side in accordance with various embodiments of the present disclosure.
Figure 6B:
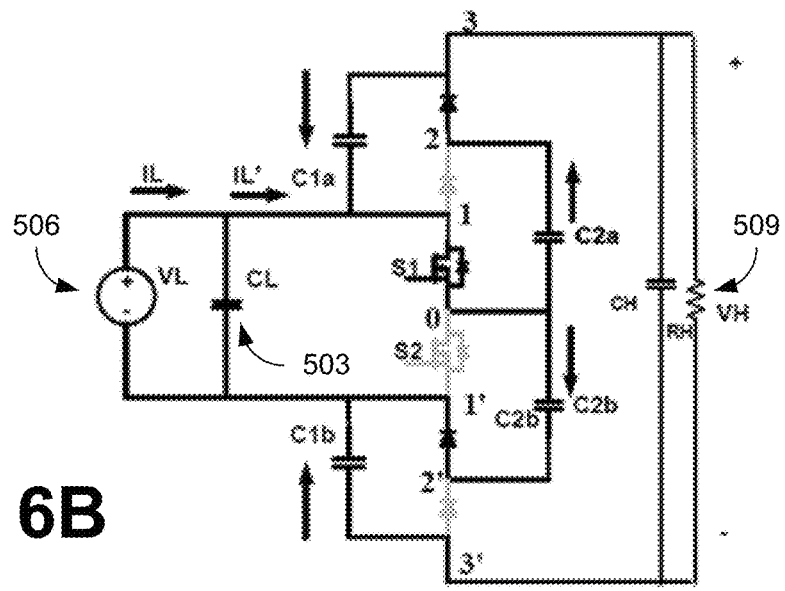
FIGS. 6B-6D are schematic diagrams illustrating examples of operational states of the 3×TBSC of FIG. 6A in accordance with various embodiments of the present disclosure.
Figure 6C:
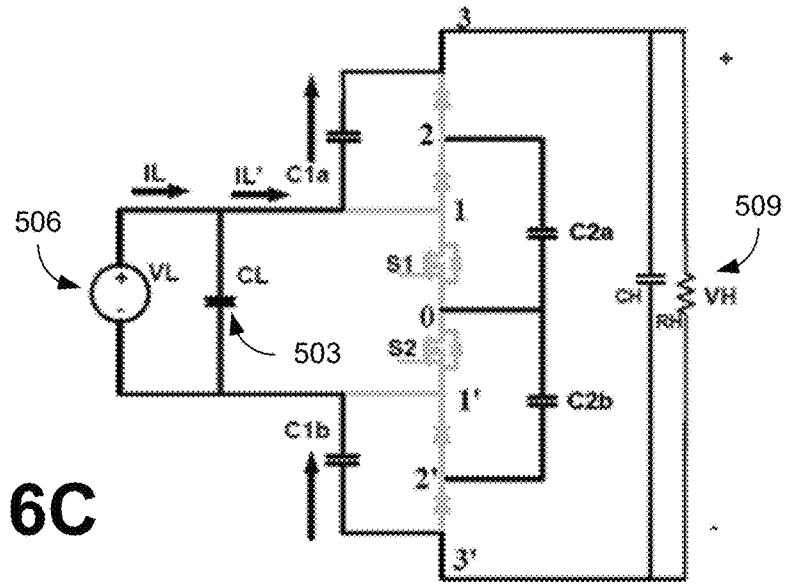
Figure 6D:
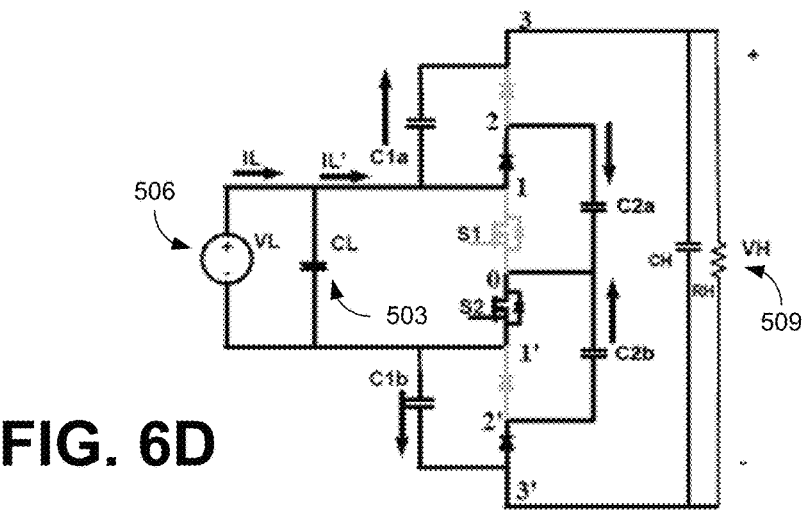

Examples of the operation of a two-switch boosting switched-capacitor converter (TBSC) will now be discussed. Without losing generality, the 3×TBSC (109 of FIG. 2C) is used as an example to explain the operation. As shown in FIG. 6A, a simple C filter (503) is included at both the low side (CL) and the high side (CH). If unregulated, the TBSC topology can realize the integer gains by controlling the two switches to operate at about 0.5 duty cycle. However, if needed, pulse width modulation (PWM) control can be performed in order to regulate the high side voltage (VH). When the duty ratio is 0.5, the operation of these two switches causes the TBSC circuit to alternate between the two sub-configurations shown in FIGS. 6B and 6D. But PWM operation with a reduced duty ratio will lead to an extra state where both switches are turned off as shown in FIG. 6C. In the following context, PWM operation is highlighted below.

(1) Operation Principal

A 3×TBSC (109) connected with a power source (506) at the low side and a load (509) at the high side is shown in FIG. 6A. The PWM control strategy is applied and the operational modes in one period are analyzed below. The switches S1 and S2 are triggered by the PWN signals illustrated by the two top waveforms (403 and 406) of FIG. 5.

State 1 During Time Interval[0, dTs]:

When S1 is on and S2 is off, the input source (506) will charge the flying capacitor C2b. The flying capacitor C1a is charged by C2a at the same state. The sub-circuit and power flow are shown in FIG. 6B.

State 2 During Time Interval [dTs, Ts/2]:

S1 and S2 are both turned off at this state, as shown in FIG. 6C. Capacitors C1a and C1b are in series with the input to power the load (509). The voltage of C2a and C2b does not change at this state.

State 3 During Time Interval [Ts/2, dTs+Ts/2]:

At this state, S2 is turned on and S1 is off. The input source (506) starts to charge C2a. C1b is charged by C2b, who is charged at state 1, shown in FIG. 6D.

State 4 During Time Interval [dTs+Ts/2, Ts]:

When both switches are off, this state has the same feature as state 2, as shown in FIG. 6C.

The waveforms shown in FIG. 5 reveal the details of the operation process. In state 1 of FIG. 6B, the voltage of C1a is increasing because it is charged by C2a. Therefore, the voltage of C2a is decreasing. When it comes to state 2 in FIG. 6C, C2a experiences a small voltage jump and stay flat then. This voltage step is caused by the equivalent series resistance (ESR) of C2a. When the discharging current of C2a disappears suddenly from state 1 to state 2, the voltage drop on the ESR of C2a also disappears. Because of the interleaved structure, the high side voltage VH exhibits little ripple. The current IL' shown in the waveform is the current after the filter at low side. It will not terminate to zero because for all states, the TBSC is continuously absorbing power. Because of filter CL, the low side current IL can be much smoother than IL'.

(2) Voltage Gain

The voltage gain of the 3×TBSC is derived as the following:

$$\frac{V_H}{V_L - V_d} = \frac{3\left(e^{-\frac{2dT_s}{RC}} - 1\right)CR_H}{(dT_s - 3T_s - RC + R_H C)e^{\frac{2dT_s}{RC}} - 2T_s e^{\frac{dT_s}{RC}} + dT_s - 3T_s - RC - R_H C} \qquad (3)$$

where $V_d$ is the voltage drop of diode. When $V_L$ is much higher than $V_d$, $V_d$ can be neglected. C is the value of intermediate capacitors, R is the charging loop equivalent resistance, and $R_H$ is the load connected at high side. The gain is a function of circuit parameters such as the values of intermediate capacitors, loop resistance, duty ratio, and switching frequency. Thus, both the duty cycle and switching frequency can be used to adjust the output voltage.

Experimental Verification

Figure 7:
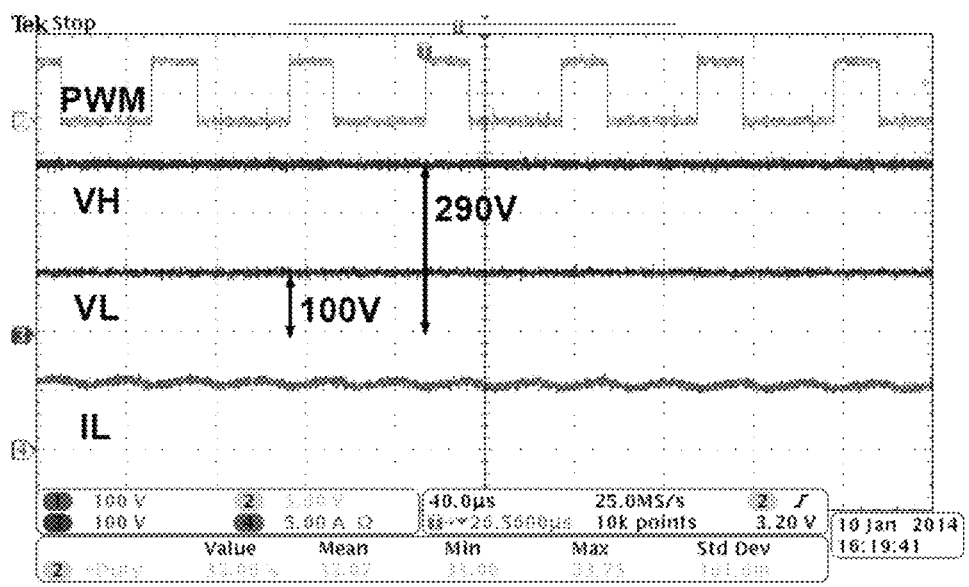
FIG. 7 is an example of experimental waveforms for the 3×TBSC of FIG. 6A in accordance with various embodiments of the present disclosure.

FIG. 7 shows an example of experimental results taken for an implementation of the 3×TBSC. The plots include PWM signaling, high side and low side voltages (VH and VL), and low side current (IL). The experimental results shown in FIG. 7 demonstrate the following features:

(1) The 3×TBSC can boost voltage from low side to high side as shown by waveform VL and VH.
(2) The input current at low side is smooth as show by IL.
(3) The output voltage ripple is small as shown by VH.

Figure 8A:
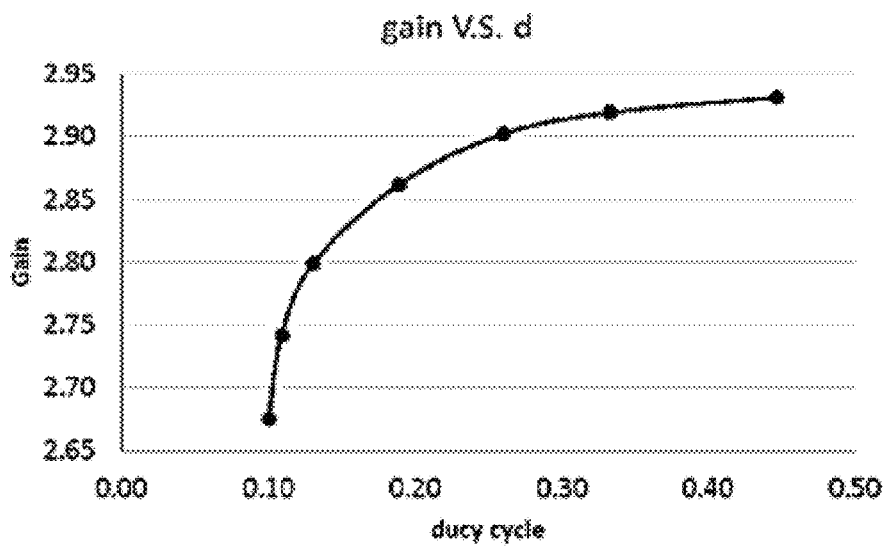
FIGS. 8A and 8B are plots illustrating examples of the duty cycle modulation (f=16.5 kHz) and frequency modulation (d=0.5) for the 3×TBSC of FIG. 6A in accordance with various embodiments of the present disclosure.
Figure 8B:
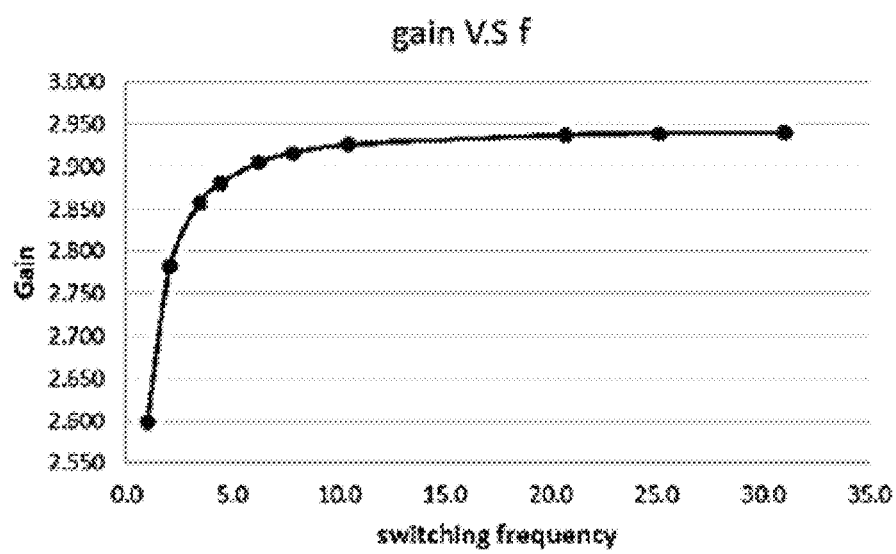

The gain verses duty ratio (duty cycle modulation) and frequency modulation were measured from the experimental results as shown in FIGS. 8A and 8B, respectively.

Extension of the TBSC Family (a) Bidirectional TBSC Extension

Figure 9:
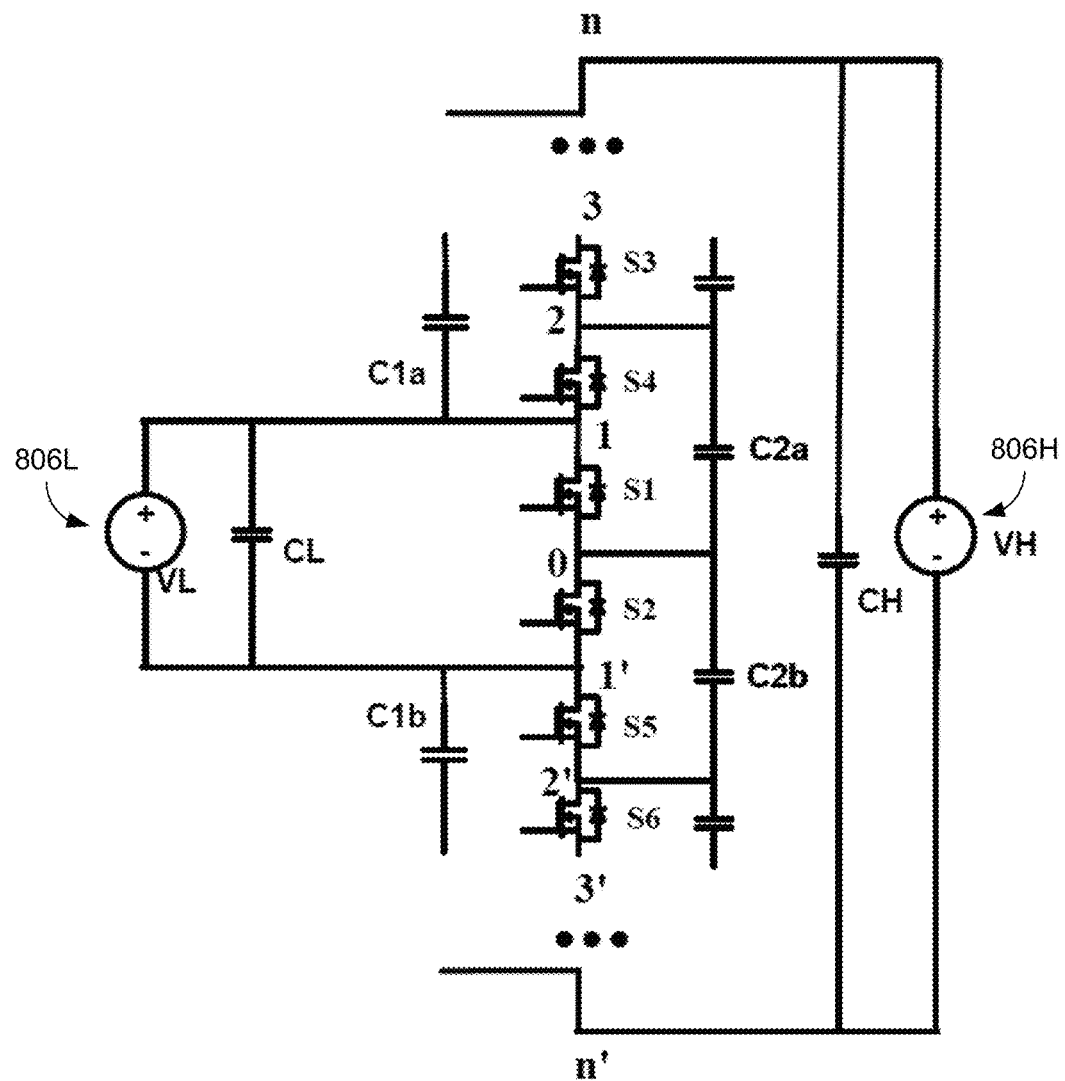
FIG. 9 is a schematic diagram of an example of a bidirectional extension of an nX TBSC in accordance with various embodiments of the present disclosure.

The n×TBSC topology illustrated in FIGS. 2A-2D can be modified to realize bidirectional power flow by replacing the diodes with active switches. An example of a bidirectional version of the n×TBSC topology is shown in FIG. 9. Either of the voltage sources VL (806L) and VH (806H) can to be used as the input source.

In the example of FIG. 8, if a voltage source (806L) is connected at low side and a load (not shown) is connected at high side, only S1 and S2 are required to be trigged to deliver power from the voltage source (806L) to the load. If a voltage source (806H) is connected at high side and a load (not shown) is connected at low side, S3, S5 and S4, S6 should be triggered separately by the interleaved PWM signal to deliver power from the high side to the low side. However, if both sides are connected with voltage sources (806L and 806H), the group of S1, S3, S5 and the group of S2, S4, S6 should be triggered by interleaved PWM signals, respectively. When the actual voltage ratio of VH/VL is greater than three, the power will be delivered from the high side to the low side. When VH/VL is smaller than three, power will be delivered from the low side to the high side. The duty cycle can be used to control the amount of charging current.

(b) Buck-Mode (Step Down) TBSC Extension

Figure 10:
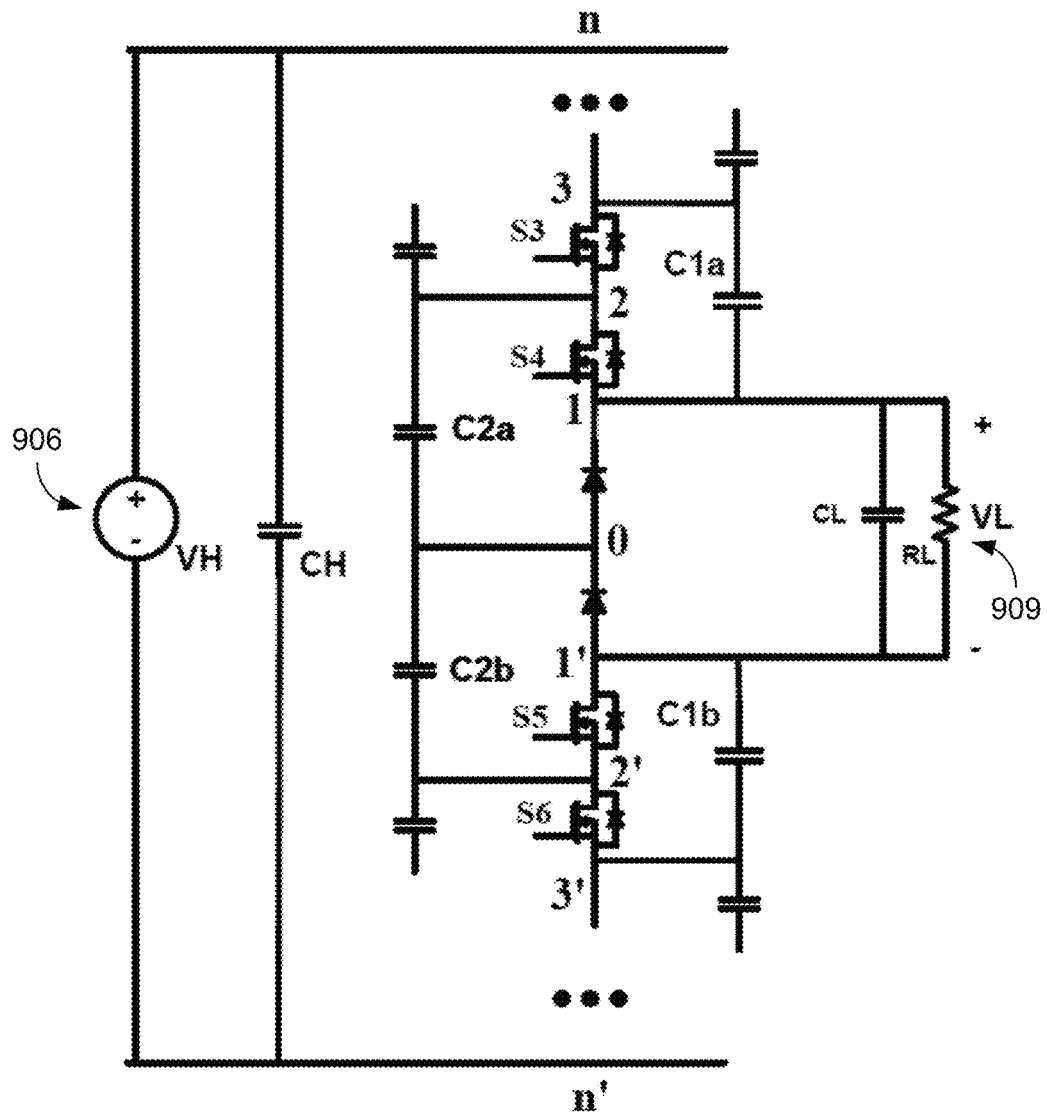
FIG. 10 is a schematic diagram of an example of a buck extension of an n×TBSC in accordance with various embodiments of the present disclosure.

To derive a buck version using the n×TBSC illustrated in FIGS. 1A-1D, the diodes in the n×TBSC topology are replaced by switches and the switches S1 and S2 are replaced by diodes. FIG. 10 shows an example of the buck version of the TBSC. The power source (906) is connected at the high side and the load (909) is connected at the low side.

In general, for all n×TBSC as well as its bidirectional extension and buck-mode versions, the switches with odd numbered subscripts are triggered by the pulses labeled S1 (403), while the switches with even numbered subscripts are triggered by the pulses labeled S2 (406) in FIG. 5.

Example of the 3× Bidirectional TBSC

Figure 12A:
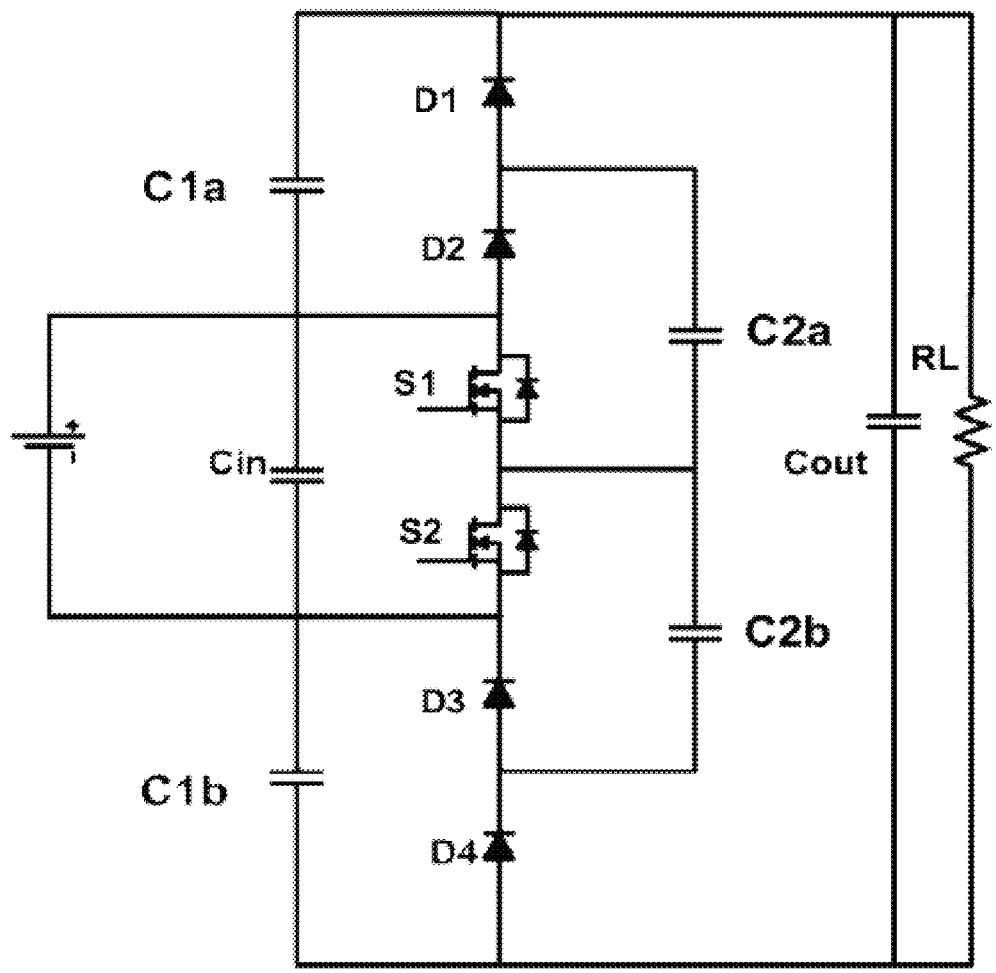
FIGS. 12A and 12B are schematic diagrams of examples of a 3× step up and step down TBSC, respectively, in accordance with various embodiments of the present disclosure.
Figure 12B:
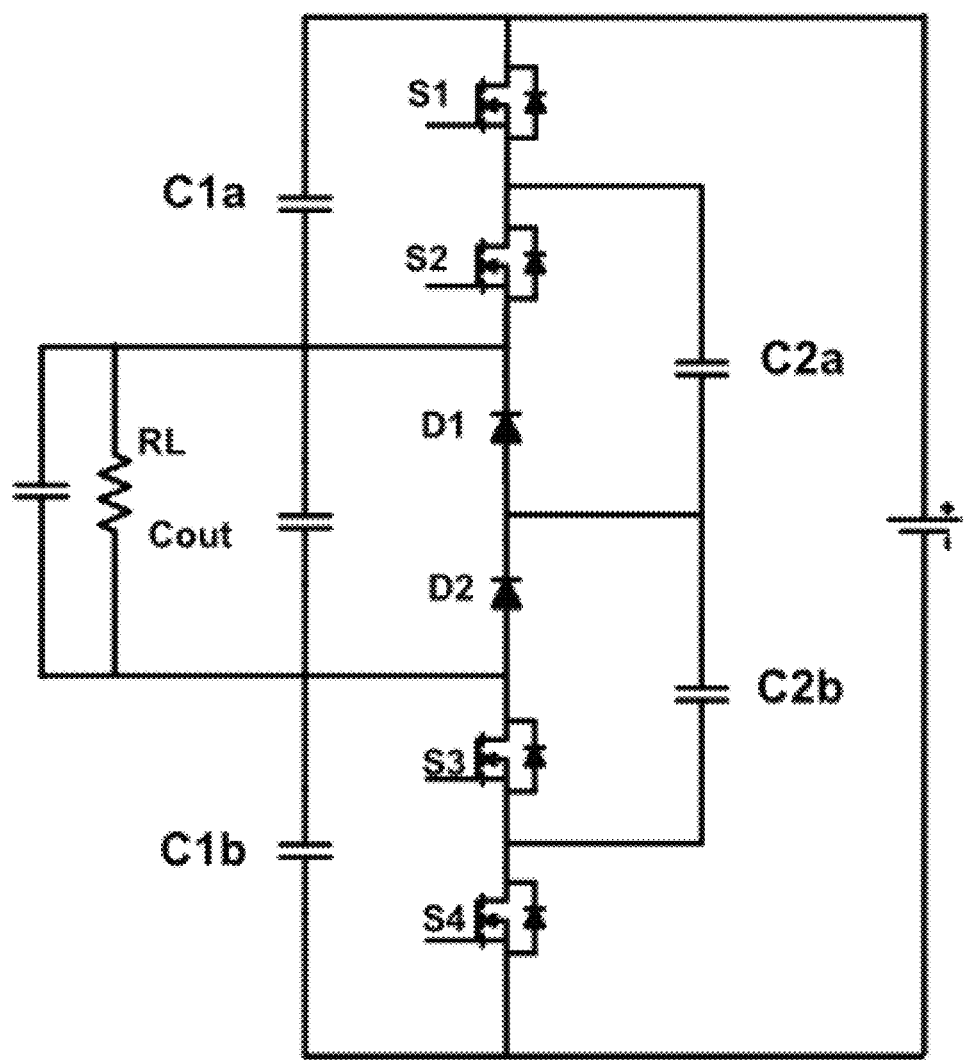

An example of a 3× bidirectional SC converter topology including six controllable switches S1-S6 is shown in FIG. 11. The topology can realize bidirectional power delivery. Based on the bidirectional design, 3× unidirectional topologies can be derived. An example of a step up SC converter topology including two controllable switches S1 and S2 is shown in FIG. 12A and an example of a step down SC converter topology including four controllable switches S1-S4 is shown in FIG. 12B. The SC converter topology in FIG. 12A can realize a similar function as the traditional converter shown in FIG. 1A with a smaller number of components, simpler control circuit and improved current waveform. The topology of FIG. 12A offers an advantage in low power applications, since it avoids the significant voltage drop on the diode at low voltage levels. Although it is bidirectional, its component cost can still be competitive when compared with a traditional unidirectional SC converter.

Referring to FIGS. 13A-13D, shown are the four working states of the bidirectional SC converter topology of FIG. 11 when operating in a step up mode. Current flow within the circuit is illustrated with arrows. The voltage and current transient waveforms of capacitors C1 and C2 of the bidirectional topology of FIG. 11 are illustrated in FIG. 14, in contrast with the switch driving signals. The voltage waveform takes into account the voltage drop on ESR. Thus the sudden change of current direction will cause an obvious voltage jump on the capacitors.

Figure 13A:
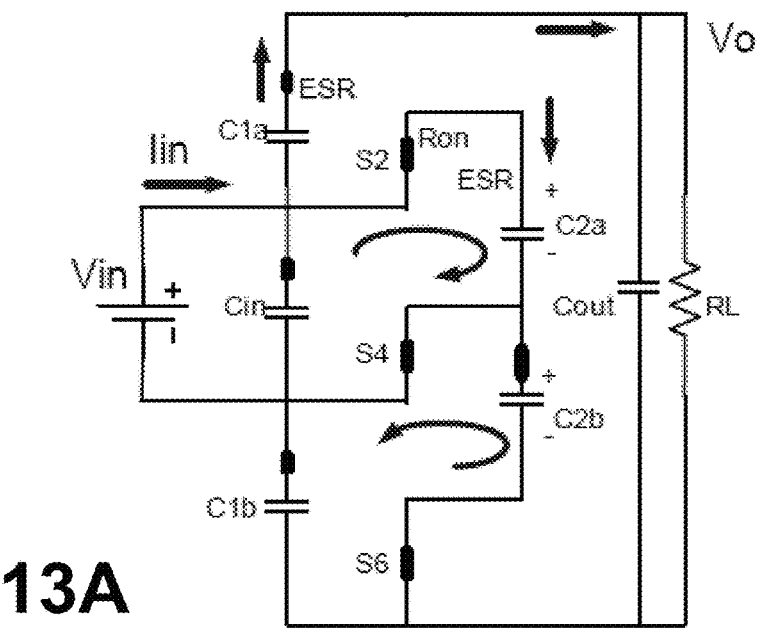
FIGS. 13A-13D are schematic diagrams illustrating examples of operational states of the 3×TBSC of FIG. 11 in a step up mode in accordance with various embodiments of the present disclosure.
Figure 13B:
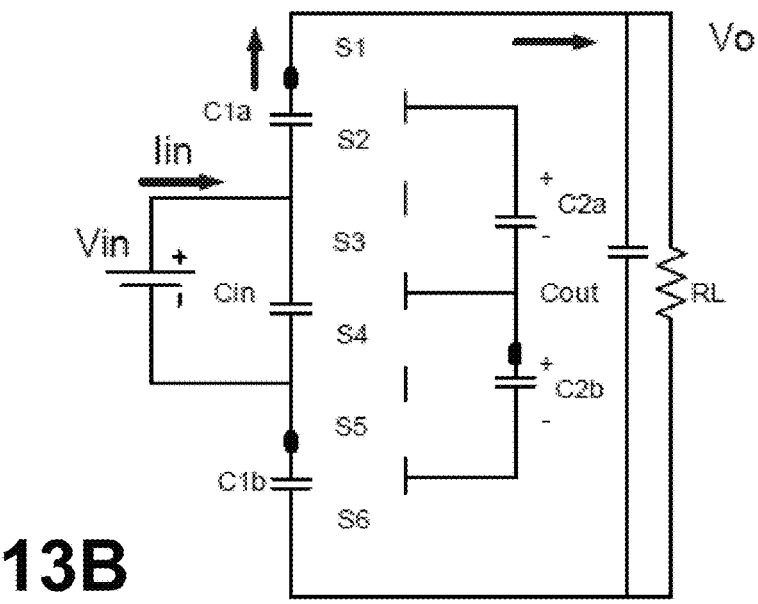
Figure 13C:
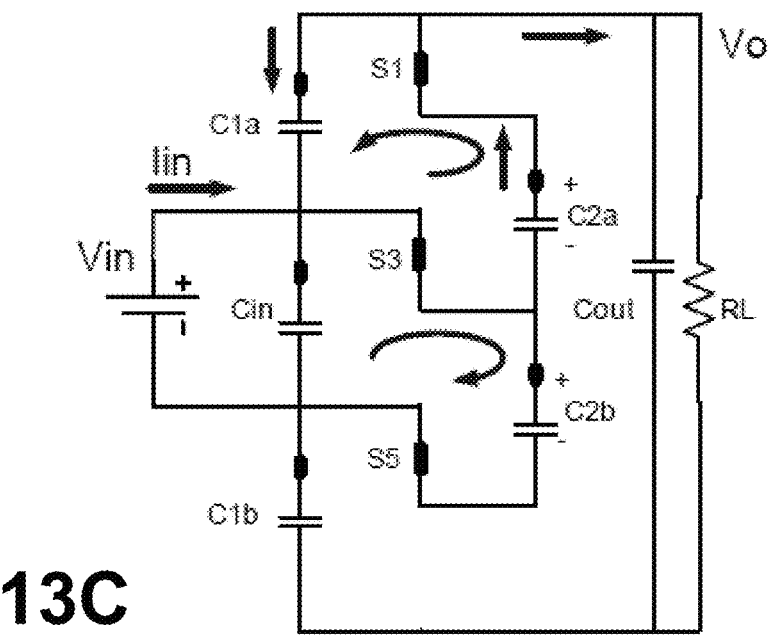
Figure 13D:
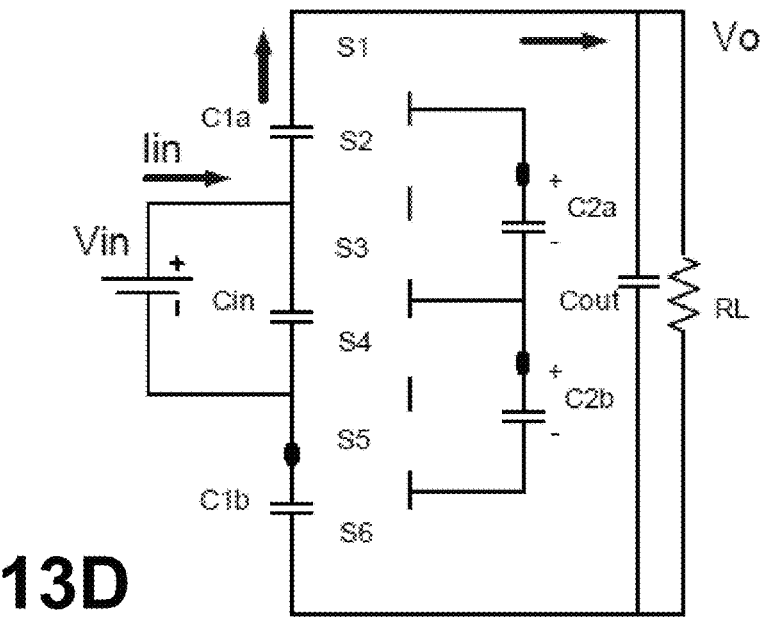
Figure 14:
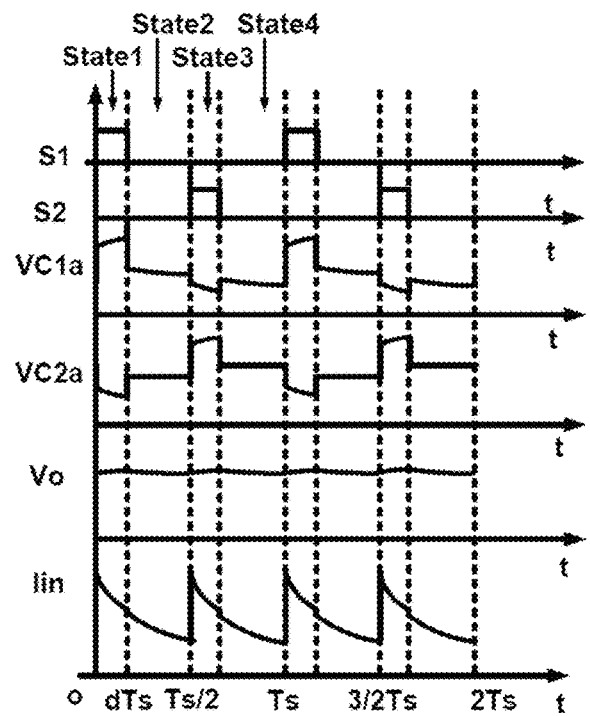
FIG. 14 is a plot illustrating an example of the operation of a 3×TBSC of FIG. 11 in the set up mode in accordance with various embodiments of the present disclosure.

Referring to FIG. 13A, which shows state 1 of the step up mode, the input voltage source (Vin) charges the capacitor C2a, while capacitor C2b discharges to C1b. Both charging loops share the same switch S4. As shown in FIG. 13B, in state 2 of the step up mode, the input voltage source (Vin) delivers power directly to the load (e.g., RL and Cout) in a series path through C1a and C1b. Moving next to FIG. 13C, which shows state 3 of the step up mode, the input voltage source (Vin) will charge C2b and C2a will deliver its stored energy to C1a. FIG. 13D illustrates state 4 of the step up mode, which is a repeat of state 2 in FIG. 13B. Even in state 2 and state 4, the input voltage source (Vin) keeps delivering power. Although C1a and C1b may have large voltage ripple, their charging and discharging time is complimentary. As a result, a very small output voltage ripple is achieved. The time period duration of state 1 and state 3 is $dT_s$, with in the range of time period [0, 2 Ts]. Proper control of the duty cycle "d" can regulate the output voltage (Vo).

Figure 15A:
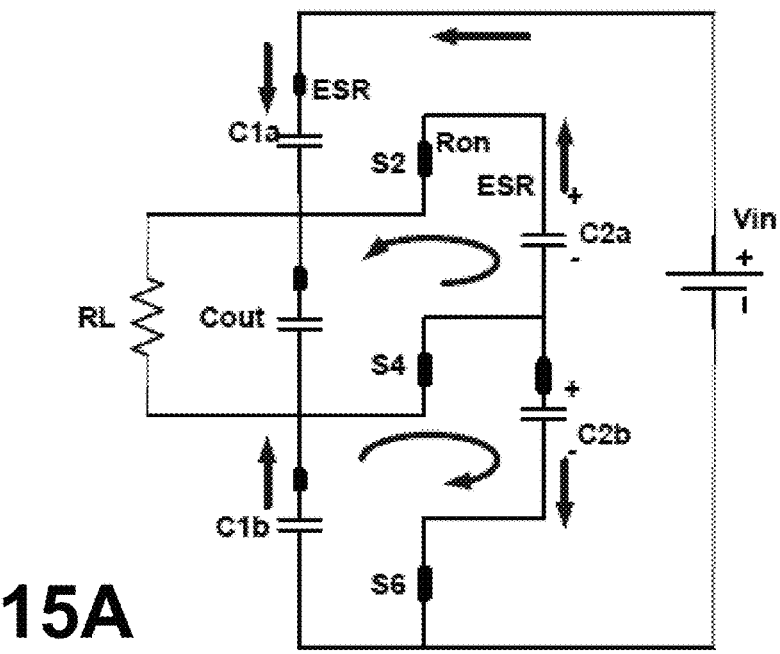
FIGS. 15A-15D are schematic diagrams illustrating examples of operational states of the 3×TBSC of FIG. 11 in a step down mode in accordance with various embodiments of the present disclosure.
Figure 15B:
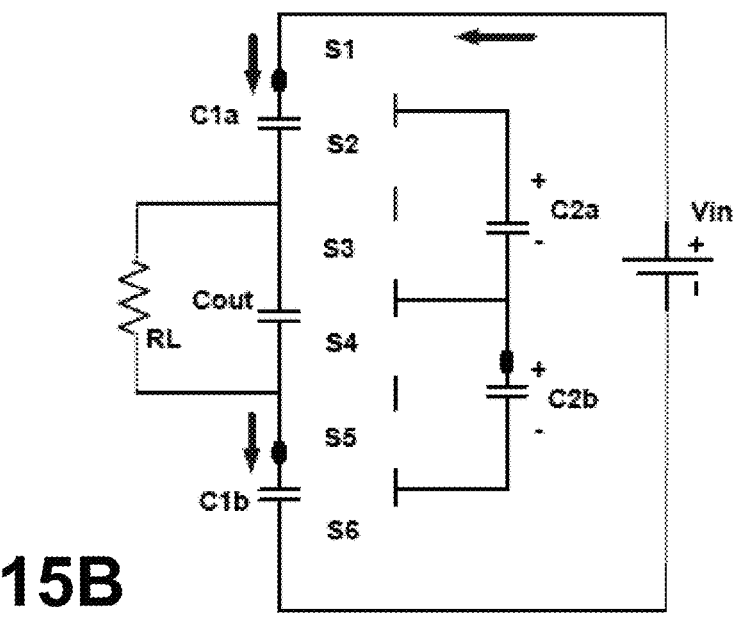
Figure 15C:
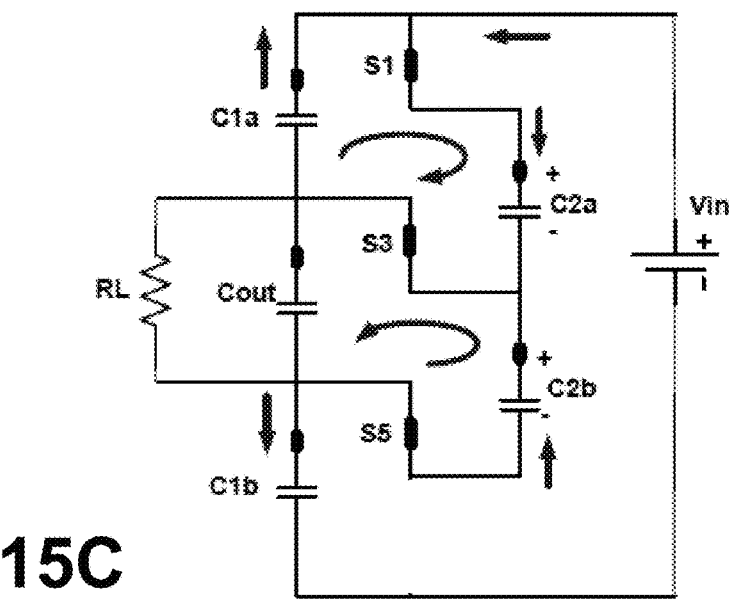
Figure 15D:
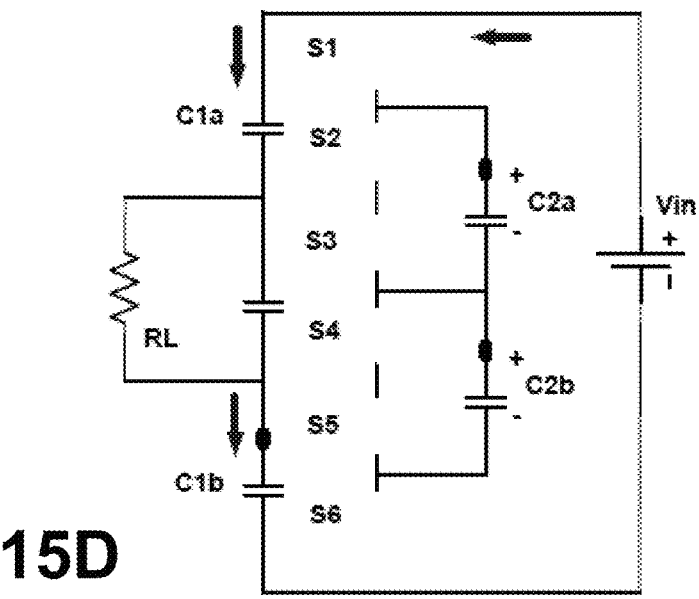

The bidirectional SC converter topology of FIG. 11 can also operate in a step down mode, which has similar analysis procedure as the described step up mode. The four working states are presented in FIGS. 15A-15D. In state 1 of the step down mode, as shown in FIG. 15A, the input voltage source (Vin) charges the capacitor C1a while capacitor C2A discharges to the load and capacitor C2b discharges to C1b. Both charging loops share the same switch S4. In state 2 of FIG. 15B, the input voltage source (Vin) delivers power directly to the load in a series path through C1a and C1b. FIG. 15C shows state 3 of the step down mode, where the charge on capacitor C2b is delivered to the load. FIG. 15D illustrates state 4 of the step down mode, which is a repeat of state 2 in FIG. 15B.

Modeling and Component Rating Analysis (a) Modeling of 3×SC Converter

The modeling procedure for a step-up mode of bidirectional SC converter topology of FIG. 11 includes the following. In state 1, when the input voltage source (Vin) is charging capacitor C2a during time [0; $dT_s$] as shown in FIG. 14, the voltage of C2a will rise from its minimum value $V_{c2min}$ to maximum $V_{c2max}$:

$$V_{c2max} = V_{in} + e^{-\frac{dT_s}{R_1 C_2}}(V_{c2min} - V_{in}), \quad (4)$$

where $R_1$ is the equivalent loop resistance of the charging loop. In state 3, the charged capacitor C2a will charge top capacitor C1a. At this time, the voltage of C1a will rise from its minimum value $V_{c1min}$ to $V_{c1max}$. Thus, following equation can be obtained for the capacitor voltage:

$$V_{c1max} = \frac{C_1 K + C_2 V_{c2max} - I_o(R_2 C_2 + dT_s)}{C_1 + C_2} - \frac{(C_2 V_{c2max} - C_2 K)e^{-\frac{(C_1+C_2)dT_s}{C_1 C_2 R_2}}}{C_1 + C_2}, \quad (5)$$

where $R_2$ is the equivalent loop resistance, and where:

$$K = V_{c1min} + \frac{R_2 C_2 I_o}{C_1 + C_2}, \text{ and} \quad (6)$$

$$I_o = \frac{V_o}{R_L}. \quad (7)$$

Since the top capacitor C1a and bottom capacitor C1b have complementary charging processes, the average output voltage can be approximated as followed:

$$V_o = V_{in} + V_{c1max} + V_{c1min}. \quad (8)$$

As the electrical charge going to the load is stopped by C2a during one period, the following equation can be obtained using the charge balance principal:

$$V_{2max} - V_{2min} = \frac{V_o T_s}{R_L C_2}. \quad (9)$$

Based on the discharging time of C1, and assuming the load is a current source with the value of $V_o/R_L$, it can be derived that:

$$V_{1max} - V_{1min} = \frac{(1-d)V_o T_s}{R_L C_2}. \quad (10)$$

Based on Equations from (4) to (10), assuming $C_1 = C_2 = C$ and $R_1 = R_2 = R$, the voltage gain can derived as:

$$\frac{V_o}{V_{in}} = \frac{3CR_L\left(1 - e^{-\frac{2dT_s}{RC}}\right)}{-(T_c + T'_s)e^{-\frac{2dT_s}{RC}} + 2T_s e^{-\frac{dT_s}{RC}} + T_c - T'_s}, \quad (11)$$

where $T_c=C(R_L+R)$ and $T'_s=dT_s-3T_s$. Note that when $R_L=\infty$, the following result exists:

$$\lim_{R_L \to \infty} \frac{V_o}{V_{in}} = \frac{3CR_L\left(1-e^{-\frac{2dT_s}{RC}}\right)}{T_c\left(1-e^{-\frac{2dT_s}{RC}}\right)} = 3. \quad (12)$$

This means that the voltage gain at no load is three. This is reasonable in the real case because the maximum output is three times the input when there is no load.

Figure 16A:
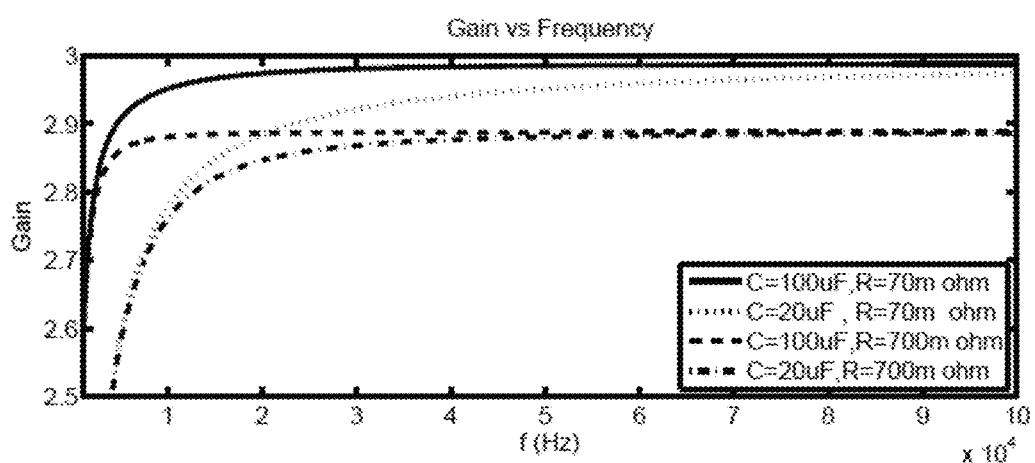
FIGS. 16A and 16B illustrate gain of the 3×TBSC of FIG. 11 over frequency and duty cycle, respectively, in accordance with various embodiments of the present disclosure.
Figure 16B:
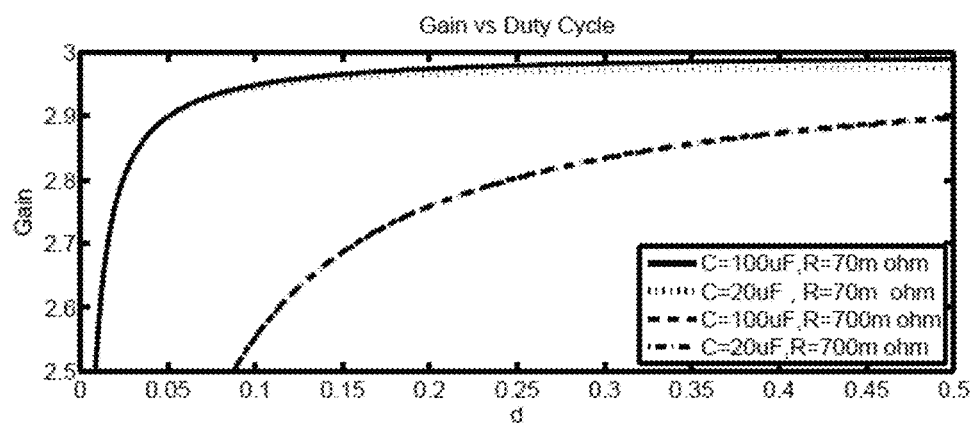

The voltage gain of Equation (11) reveals that many circuit and control parameters can affect the voltage gain. For example, the switching frequency can be used to modulate the voltage gain as well as the duty cycle. Examples of the modulation curves are given in FIGS. 16A and 16B with variation of the flying capacitor value and loop resistance. According to the frequency modulation curve of FIG. 16A, the voltage gain levels decrease in the high frequency region with a higher flying capacitance. In low frequency region, a larger capacitor tends to give a higher voltage gain. At high frequency, the loop resistance tends to determine the final voltage gain. When the operating frequency is fixed, a larger capacitor and a smaller loop resistance will lead to higher voltage gain, consequently higher system efficiency. This becomes more obvious in the low frequency region. According to the duty cycle modulation curve of FIG. 16B, the smaller loop resistance leads to a higher voltage gain under same duty cycle condition. The capacitor effect becomes minor although there are some noticeable effects in the high frequency region. Based on the analysis above, the SC converter design is a system-wide compromise about the circuit parameters and control parameters.

(b) Component Rating Analysis

Based on the circuit configuration of FIG. 11, capacitors C2a, C2b, C1a and C1b will all be subject to the maximum voltage of Vin. For switches S1 to S6, they also have to withstand the maximum voltage of Vin. Thus, for the bidirectional converter of FIG. 11, the voltage rating of the components is uniform and easy to choose with knowledge of the input voltage.

Figure 17:
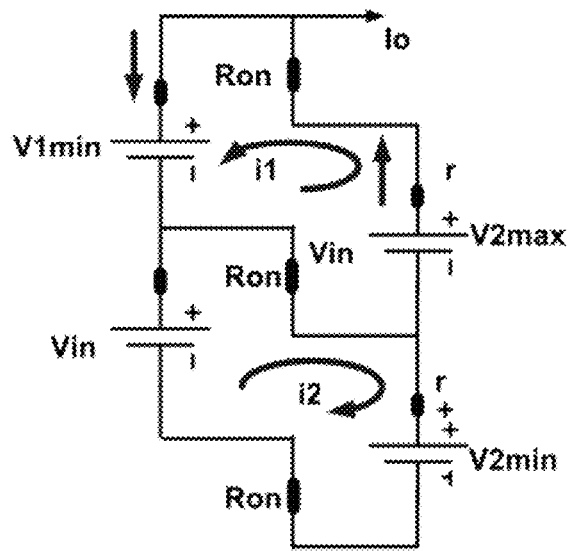
FIG. 17 is a schematic diagram illustrating the maximum rush current moment of the 3×TBSC of FIG. 11 in accordance with various embodiments of the present disclosure.

As for the current rating, the rush current in this type of converter is an important consideration. Referring to FIG. 17, shown is the SC converter state where the peak current occurs. Using Equations (4) to (10), the expression of $V_{1min}$, $V_{2max}$ and $V_{2min}$ as function of $V_{in}$ can be derived. Loop resistance R can be estimated:

$$R=r+2R_{on}. \quad (13)$$

Thus the next step is to calculate i1 and i2 in FIG. 10 to find out the rush current rating of switches. Based on KVL and KCL, the following equations can be derived:

$$V_{2max}-i_1(r+R_{on})-(i_1-i_o)r-V_{1min}-(i_1+i_2)R_{on}=0, \quad (14)$$

and $$V_{in}-(i_1+i_2)R_{on}-(i_2-i_1)(r+R_{on})-V_{2min}=0. \quad (15)$$

To simplify the solution for $i_1$ and $i_2$, it can be assumed that $r \ll R_{on}$. Using this assumption, the following results can be obtained:

$$i_1 = -\frac{1}{4}\frac{-2V_{2max}+2V_{1min}-V_{2min}+V_{in}}{R_{on}}, \text{ and} \quad (16)$$

$$i_2 = -\frac{1}{2}\frac{-V_{min}+V_{2min}}{R_{on}}. \quad (17)$$

Since R and $V_{in}$ are known, $V_{2max}$, $V_{1max}$ and $V_{2min}$ can be calculated. Therefore, the peak current $i_1$ and $i_2$ can be estimated. This result is derived based upon some approximation, but is adequate to be used as a reference for switch selection.

Simulation and Experimental Results

Figure 18A:
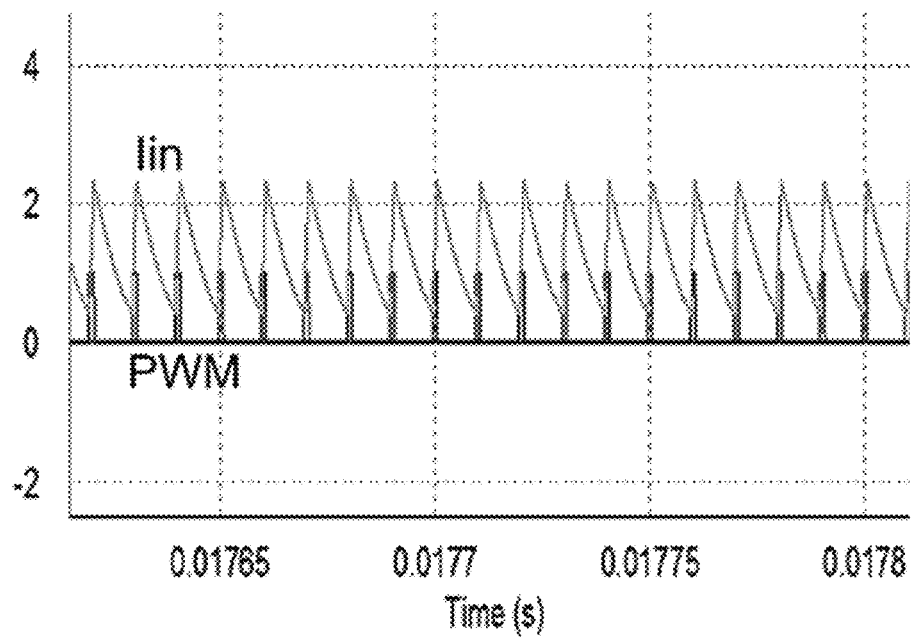
Figure 18B:
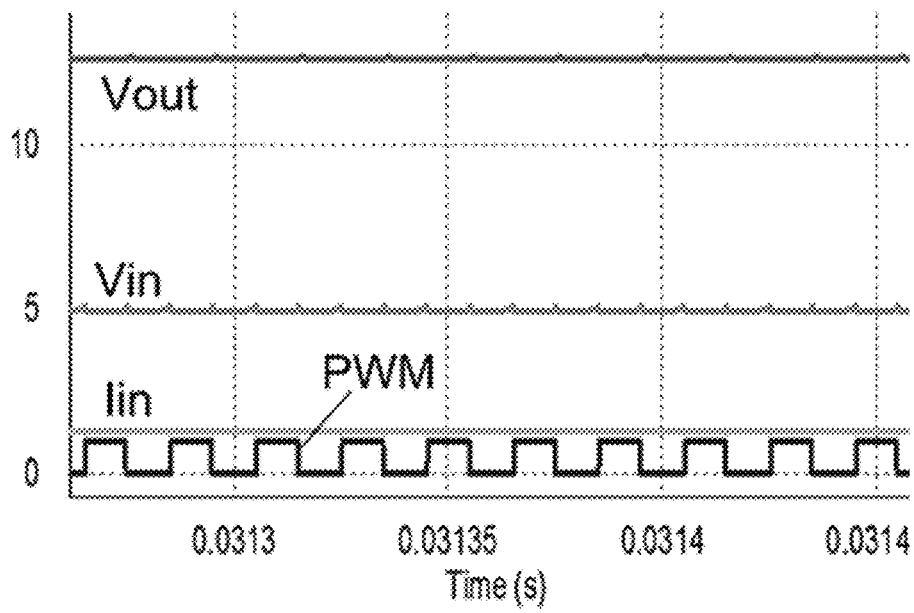

Initially, the 3×SC converter of FIG. 11 was simulated using PSIM. Referring to FIG. 18A, shows are plots of the input current (Iin) and pulse width modulation (PWM) waveform. FIG. 18B shows plots of the input voltage (Vin) and the output voltage (Vout). The simulation results of FIGS. 18A and 81B show that the 3×SC converter can realize good input current profile while maintaining small input and output voltage ripple.

To verify operation, a 10 W 5V to 14V prototype was built and experimentally tested. Six 100 μF electrolytic capacitors with high ESR and low ESR conditions were tested. IRF3710 MOSFETs with an Rds(on) of 23 mohms were used. The experimental results are shown in FIGS. 19A-19C. The experimental waveforms of Vc2, Iout, and the PWM are shown in FIG. 19A. It can be seen that the voltage of C2a and C2b exhibits a voltage jump, as expected. This may be attributed to the effect of ESR and the sudden change in the current direction. FIG. 19B shows the experimental waveform of Iout and the PWM, which are similar to the simulation results of FIG. 18A.-FIG. 19C shows the experimental waveforms for Vout, Vin, Iout and the PWM, which are similar to the simulation results of FIG. 18B. The output voltage and input voltage ripples are minimized by the interleaved operation.

Referring next to FIGS. 20A-20C, shown are various plots illustrating examples of the regulation capabilities of the SC converter of FIG. 11. FIGS. 20A and 20B are plots illustrating examples of the relationship between the duty cycle, efficiency and output power of the SC converter. When the output voltage was regulated at 14V as shown in FIG. 20A, the duty cycle was modulated with variation of the load. At a duty cycle of about 0.5, a maximum output power under 14V output was exhibited. This maximum output power was largely dependent on loop resistance. The testing results of FIG. 20B demonstrates that a smaller charging loop resistance can increase maximum power delivered by the converter while maintaining the high efficiency. Generally, decreasing the ESR of the capacitance and Rds(on) of the switches can increase the maximum output power under a high gain condition. A higher gain can mean higher system efficiency based on the properties of SC converter. As can be seen from the plot of efficiency as a function of output power in FIG. 20C, the SC converter achieved efficiencies above 90% with regulation over a wide range of loads.

Further Extension of TBSC Family

The two-switch boosting switched-capacitor converter (TBSC) is a new family of high efficiency switched capacitor (SC) converters with two or more switches and regulation capability. This TBSC family presents opportunity to realize interleaved high gain conversion with minimized switch usage. The non-regulated version can achieve all integer voltage gains starting from two. The TBSC family contains two subfamilies: Odd-gain TBSC and even-gain TBSC. They have voltage gain expressions for even-gain TBSC given by:

$$\frac{V_o}{V_{in}} = n(n=2,4,6,\ldots). \quad (18)$$

and for odd-gain TBSC given by:

$$\frac{V_o}{V_{in}} = n (n = 3, 5, 7, \ldots), \quad (19)$$

The even-gain and odd-gain topologies are presented in FIGS. 21A and 21B, respectively. As can be seen, the difference in topologies depends upon the number of gain-extension networks as illustrated in FIGS. 2B-2D.

SUMMARY

A family of TBSC has been described herein. The interleaved operation yields small current ripple and voltage ripple with a reduced number of components, as well as low/uniform voltage stress for all components. The TBSCs are most suitable for unregulated applications (with duty ratio of 0.5), when the efficiency is most favorable with nX gain. It can also be controlled by a PWM strategy to regulate the output voltage to a level near and/or below nX, when the efficiency may be compromised. By replacing all the diodes with active switches, the TBSC family can be extended to perform bidirectional power flow operations. Furthermore, if the diodes are replaced by active switches and the switches are replaced by diodes, the TBSC family can be extended for buck mode (step down) operation. Because inductive components are absent, the TBSC family and its extensions have a good potential for low cost and small-size applications, as well as integration on chips.

The interleaved bidirectional switched capacitor converter with regulation capability can be used to incrementally step up (or step down) the output voltage (e.g., by about three times) and regulate the output, while-achieving good input current profile as well as small output voltage ripple. Due to its interleaved structure, fewer components are utilized when compared with traditional interleaved switched-capacitor converters with similar functionality. The number of switches can be reduced by modifying the SC converter topology for unidirectional converter operation with diodes. A PWM technique can be used to regulate the output voltage.

A bidirectional 3xSC converter was modeled and experimentally tested. The natural interleaved structure makes it easier to reduce current ripple and output voltage ripple compared with other topologies. It can be used in solar energy or battery management system with regulation capability. Its efficiency can be high if designed properly. The unidirectional versions are also presented with reduced switches, which have big potential in reducing cost and volume. The modeling revealed more detailed parameter effects on voltage gain compared with average-state spacing method. The experimental results demonstrated good efficiency, continuous input current, low output voltage ripple, and voltage regulation capability of 3xSC converter. The experimental results demonstrate the feasibility of the SC converter topology and regulation technique.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A two-switch boosting switched-capacitor converter, comprising:
   a first switch and a second switch connected in series across a low side input;
   a first gain-extension network connected between a first end and a second end of the first switch, the first gain-extension network consisting of:
     a first diode, having a first end and a second end, connected at its first end to the first end of the first switch, and
     a first capacitor connected between the second end of the first switch and the second end of the first diode, where the first diode is forward biased from the first end of the first diode to the second end of the first diode;
   a second gain-extension network connected between a first end and a second end of the second switch, the second gain-extension network consisting of:
     a second diode, having a first end and a second end, connected at its first end to the first end of the second switch, and
     a second capacitor connected between the second end of the second switch and the second end of the second diode, where the second diode is forward biased from the second end of the second diode to the first end of the second diode;
   wherein the series connection between the second end of the first switch and the second end of the second switch is only connected to the first capacitor and the second capacitor; and
   wherein interleaved operation of the first and second switches causes a voltage applied across the first and second switches at the low side input to be boosted at a load.

2. The two-switch boosting switched-capacitor converter of claim 1, wherein the second end of the first and second diodes are coupled to a high side output.

3. The two-switch boosting switched-capacitor converter of claim 2, wherein interleaved operation of the first and second switches with a duty ratio of about 0.5 boosts the voltage supplied across the first and second switches by a factor of about two.

4. The two-switch boosting switched-capacitor converter of claim 2, further comprising an output filter coupled across the high side output.

5. The two-switch boosting switched-capacitor converter of claim 1, further comprising an input filter coupled across the low side input.

6. The two-switch boosting switched-capacitor converter of claim 1, further comprising:
   a third gain-extension network coupled to the first gain-extension network, the third gain extension network consisting of:
      a third diode connected at a first end to the second end of the first diode in the first gain-extension network, and
      a third capacitor connected between a second end of the third diode in the third gain-extension network and the connection between the first end of the first switch and the first end of the first diode of the first gain-extension network; and
   a fourth gain-extension network consisting of:
      a fourth diode connected at a first end to the second end of the second diode in the second gain-extension network, and
      a fourth capacitor connected between a second end of the fourth diode in the fourth gain-extension network and the connection between the first end of the second switch and the first end of the second diode of the second gain-extension network.

7. The two-switch boosting switched-capacitor converter of claim 6, wherein interleaved operation of the first and second switches with a duty ratio of about 0.5 boosts the voltage supplied across the first and second switches by a factor of about three.

8. The two-switch boosting switched-capacitor converter of claim 1, comprising a plurality of n pairs of gain-extension networks including:
   a first series of n gain-extension networks comprising the first gain-extension network coupled to the first switch opposite the second switch and a plurality of subsequent gain-extension networks having corresponding diodes connected in series with the first diode of the first gain-extension network, where each of the plurality of subsequent gain-extension networks in the first series comprise a capacitor connected across the corresponding diode of that gain-extension network and the corresponding diode of a preceding gain-extension network in the first series; and
   a second series of n gain-extension networks comprising the second gain-extension network coupled to the second switch opposite the first switch and a plurality of subsequent gain-extension networks having corresponding diodes connected in series with the second diode of the second gain-extension network, where each of the plurality of subsequent gain-extension networks in the second series comprise a capacitor connected across the corresponding diode of that gain-extension network and the corresponding diode of a preceding gain-extension network in the second series.

9. The two-switch boosting switched-capacitor converter of claim 8, wherein interleaved operation of the first and second switches with a duty ratio of about 0.5 boosts the voltage supplied across the first and second switches by a factor of about n+1, wherein n is the number of pairs of gain-extension networks.

10. A bucking switched-capacitor converter, comprising:
    a first diode and a second diode connected in series across a low side output, where a first end of the first diode is connected to a second end of the second diode;
    a first gain-extension network connected between the first end of the first diode and a second end of the first diode, the first gain-extension network consisting of:
       a first switch, having a first end and a second end, connected at its second end to the second end of the first diode, and
       a first capacitor connected between the first end of the first switch and the first end of the first diode, where the first diode is forward biased from the first end of the first diode to the second end of the first diode;
    a second gain-extension network connected between a first end of the second diode and the second end of the second diode, the second gain-extension network consisting of:
       a second switch, having a first end and a second end, connected at its first end to the first end of the second diode, and
       a second capacitor connected between the second end of the second switch and the second end of the second diode, where the second diode is forward biased from the first end of the second diode to the second end of the second diode;
    wherein the first diode excludes another switch connected in parallel across its first end and second end;
    wherein the second diode excludes another switch connected in parallel across its first end and second end;
    wherein the series connection between the first end of the first diode and the second end of the second diode is only connected to the first capacitor and the second capacitor; and
    wherein interleaved operation of the first and second switches of the first and second gain-extension networks bucks a voltage applied across the first and second gain-extension networks via a high side input.

11. The bucking switched-capacitor converter of claim 10, comprising a plurality of n pairs of gain-extension networks including:
    a first series of n gain-extension networks comprising the first gain-extension network coupled to the first diode and a plurality of subsequent gain-extension networks having corresponding switches connected in series with the first switch of the first gain-extension network, where each of the plurality of subsequent gain-extension networks in the first series comprise a capacitor connected across the corresponding switch of that gain-extension network and the corresponding switch of a preceding gain-extension network in the first series; and
    a second series of n gain-extension networks comprising the second gain-extension network coupled to the second diode and a plurality of subsequent gain-extension networks having corresponding switches connected in series with the second switch of the second gain-extension network, where each of the plurality of subsequent gain-extension networks in the second series comprise a capacitor connected across the corresponding switch of that gain-extension network and the corresponding switch of a preceding gain-extension network in the second series.

12. The bucking switched-capacitor converter of claim 11, wherein interleaved operation of the switches of the plurality of n pairs of gain-extension networks with a duty ratio of about 0.5 bucks a voltage applied across the n pairs of gain-extension networks by a factor of about n+1, wherein n is the number of pairs of gain-extension networks.

13. The bucking switched-capacitor converter of claim 10, further comprising an output filter coupled across the low side output.

14. The bucking switched-capacitor converter of claim 10, further comprising an input filter coupled across the high side input.

15. A bidirectional switched-capacitor converter, comprising:
- a first switch and a second switch connected in series across a low side connection; and
- a pair of gain-extension networks including a first gain-extension network coupled to the first switch opposite the second switch and a second gain-extension network coupled to the second switch opposite the first switch, where the first gain-extension network consists of a corresponding switch connected to the first switch opposite the second switch and a capacitor connected across that corresponding switch and the first switch, and the second gain-extension network consists of a corresponding switch connected to the second switch opposite the first switch and a capacitor connected across that corresponding switch and the second switch, where the series connection between the first and second switches is only connected to the capacitors of the first and second gain-extension networks;
- where interleaved operation of the first and second switches and the switches of the pair of gain-extension networks boosts a voltage applied across the first and second switches at the low side connection or bucks a voltage applied across the pair of gain-extension networks via a high side connection and wherein the interleaved operation includes at least one cycle in which the first and second switches and the switches of the pair of gain-extension networks are simultaneously in an off state for at least a portion of the at least one cycle.

16. The bidirectional switched-capacitor converter of claim 15, comprising a plurality of n pairs of gain-extension networks including:
- a first series of n gain-extension networks comprising the first gain-extension network coupled to the first switch opposite the second switch and a plurality of subsequent gain-extension networks having corresponding switches connected in series with the corresponding switch of the first gain-extension network, where each of the plurality of subsequent gain-extension networks in the first series comprise a capacitor connected across the corresponding switch of that gain-extension network and the corresponding switch of a preceding gain-extension network in the first series; and
- a second series of n gain-extension networks comprising the second gain-extension network coupled to the second switch opposite the first switch and a plurality of subsequent gain-extension networks having corresponding switches connected in series with the corresponding switch of the second gain-extension network, where each of the plurality of subsequent gain-extension networks in the second series comprise a capacitor connected across the corresponding switch of that gain-extension network and the corresponding switch of a preceding gain-extension network in the second series.

17. The bidirectional switched-capacitor converter of claim 16, wherein interleaved operation of the first and second switches and the switches of the plurality of n pairs of gain-extension networks with a duty ratio of about 0.5 boosts the voltage applied across the first and second switches at the low side connection by a factor of about n+1 or bucks a voltage applied across the n pairs of gain-extension networks by a factor of about n+1, wherein n is the number of pairs of gain-extension networks.

18. The bidirectional switched-capacitor converter of claim 15, wherein a load is coupled across the high side connection.

19. The bidirectional switched-capacitor converter of claim 15, further comprising a filter coupled across the low side connection.

20. The bidirectional switched-capacitor converter of claim 15, further comprising a filter coupled across the high side connection.

* * * * *